US012761379B2

(12) United States Patent
Tagawa

(10) Patent No.: US 12,761,379 B2
(45) Date of Patent: Oct. 13, 2026

(54) RADIATION IMAGING APPARATUS AND RADIATION IMAGING SYSTEM

(71) Applicant: CANON KABUSHIKI KAISHA, Tokyo (JP)

(72) Inventor: Motoki Tagawa, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 170 days.

(21) Appl. No.: 18/629,997

(22) Filed: Apr. 9, 2024

(65) Prior Publication Data

US 2024/0255656 A1 Aug. 1, 2024

Related U.S. Application Data

(63) Continuation of application No. PCT/JP2022/039072, filed on Oct. 20, 2022.

(30) Foreign Application Priority Data

Oct. 25, 2021 (JP) ................................ 2021-174068
Nov. 25, 2021 (JP) ................................ 2021-191438

(51) Int. Cl.
*G01T 1/17* (2006.01)
*G01T 1/02* (2006.01)
*G01T 1/24* (2006.01)

(52) U.S. Cl.
CPC ................ *G01T 1/17* (2013.01); *G01T 1/026* (2013.01); *G01T 1/244* (2013.01)

(58) Field of Classification Search
CPC ............ G01T 1/17; G01T 1/026; G01T 1/244
See application file for complete search history.

(56) References Cited

U.S. PATENT DOCUMENTS 5,751,783 A * 5/1998 Granfors ................ A61B 6/542 378/97
2004/0156473 A1 8/2004 Nonaka
2011/0249791 A1 10/2011 Wang
(Continued)

FOREIGN PATENT DOCUMENTS

CN 106473760 A 3/2017
JP 2012-011057 A 1/2012
(Continued)

OTHER PUBLICATIONS

Extended European Search Report issued by the European Patent Office on Sep. 24, 2025 in corresponding EP Patent Application No. 22886848.5.

(Continued)

*Primary Examiner* — Uzma Alam
*Assistant Examiner* — Fani Polyzos Boosalis
(74) *Attorney, Agent, or Firm* — Carter, DeLuca & Farrell LLP

(57) ABSTRACT

A radiation imaging apparatus includes: a notification device configured to notify a receptor field used in radiation imaging among a plurality of receptor fields capable of monitoring an irradiation radiation dose; and one or more controllers configured to, in a case where the irradiation radiation dose satisfies predetermined condition corresponding to the selected state of the receptor fields notified by the notification device, output a signal for stopping irradiation.

15 Claims, 12 Drawing Sheets

(56) References Cited

U.S. PATENT DOCUMENTS

| | | | |
|---|---|---|---|
| 2013/0058453 A1 | 3/2013 | Kuwabara | |
| 2013/0058456 A1 | 3/2013 | Kuwabara | |
| 2015/0010129 A1 | 1/2015 | Schliermann | |
| 2015/0055752 A1 | 2/2015 | Takahashi | |
| 2016/0266260 A1* | 9/2016 | Preston | G01T 1/208 |
| 2019/0054320 A1* | 2/2019 | Owens | A61N 5/1071 |

FOREIGN PATENT DOCUMENTS

| | | | | |
|---|---|---|---|---|
| JP | 2013-524477 A | 6/2013 | | |
| JP | 2017-127444 A | 7/2017 | | |
| JP | 2018-050828 A | 4/2018 | | |
| JP | 2020-162971 A | 10/2020 | | |
| JP | 2021079020 A | * | 5/2021 | A61B 6/586 |
| WO | 2011/130210 A2 | 10/2011 | | |
| WO | 2020/036225 A1 | 2/2020 | | |

OTHER PUBLICATIONS

International Search Report issued by the Japan Patent Office on Dec. 27, 2022 in corresponding International Application No. PCT/JP2022/039072, with English translation.

* cited by examiner

RADIATION IMAGING APPARATUS AND RADIATION IMAGING SYSTEM

CROSS-REFERENCE TO RELATED APPLICATIONS

This application is a Continuation of International Patent Application No. PCT/JP2022/039072, filed Oct. 20, 2022, which claims the benefit of Japanese Patent Application No. 2021-174068, filed Oct. 25, 2021, and Japanese Patent Application No. 2021-191438, filed Nov. 25, 2021, all of which are hereby incorporated by reference herein in their entirety.

BACKGROUND OF THE INVENTION

Field of the Invention

The present invention relates to a radiation imaging apparatus and radiation imaging system applied to a medical image diagnostic apparatus.

Background Art

Recently, an apparatus that obtains a digital image using a semiconductor sensor is becoming popular as a radiation imaging apparatus used for medical image diagnosis. The obtained image can be instantaneously checked, unlike an image obtained by a conventional photosensitive film, so high work efficiency is implemented.

PTL 1 discloses a radiation imaging apparatus having an Auto Exposure Control (AEC) function (to be referred to as an AEC function hereinafter) in order to obtain an image of a proper optical density and manage the dose at the time of imaging. The AEC function is a function of monitoring an irradiated radiation dose and when it reaches a predetermined threshold, stopping the irradiation. More specifically, there are a method of monitoring an irradiated radiation dose using some of pixels for forming an image, a method of monitoring an irradiated radiation dose using another internal sensor, and the like.

It is also disclosed that a pixel region (to be referred to as a receptor field hereinafter) for monitoring an irradiation dose can be arbitrarily designed and only a specific receptor field can be used selectively from a plurality of receptor field candidates based on imaging conditions and the like. These days, weight saving techniques and wireless techniques are advanced, and even portable radiation imaging apparatuses are also developed. PTL 2 proposes a portable radiation imaging apparatus having the AEC function.

Since the AEC function can be implemented using the image sensor of a radiation imaging apparatus, choices of regions used as receptor fields can be increased, compared to a conventional apparatus. Thus, optimal receptor fields can be used in various imaging situations. Meanwhile, the user needs to recognize a selected receptor field and position a target imaging region in the receptor field so as not to cause excessive irradiation and under-irradiation by imaging in an erroneous receptor field.

PTL 3 proposes an imaging system in which a receptor field region used is projected from a radiation source opposing a radiation imaging apparatus so that the receptor field region used can be recognized at the time of positioning.

CITATION LIST

Patent Literature

PTL 1: Japanese Patent Laid-Open No. 2017-127444
PTL 2: Japanese Patent Laid-Open No. 2020-162971
PTL 3: Japanese Patent Laid-Open No. 2018-50828

However, in a portable radiation imaging apparatus, it is difficult to obtain information about the distance and relative angle between the radiation source and the radiation imaging apparatus. In the above-mentioned system using projection from the radiation source, a desired receptor field region may be hardly recognized when the orientation or position of the radiation imaging apparatus is changed.

The present invention provides a radiation imaging technique capable of announcing or changing a receptor field region used in radiation imaging.

SUMMARY OF THE INVENTION

According to one aspect of the present invention, there is provided a radiation imaging apparatus comprising: a notification device configured to notify a receptor field used in radiation imaging among a plurality of receptor fields capable of monitoring an irradiation radiation dose; and one or more controllers configured to, in a case where the irradiation radiation dose satisfies predetermined condition corresponding to the selected state of the receptor fields notified by the notification device, output a signal for stopping irradiation.

According to another aspect of the present invention, there is provided a radiation imaging apparatus comprising: an operation device configured to change, to another receptor field, at least one receptor field selected in advance from a plurality of receptor fields capable of monitoring an irradiation radiation dose; and one or more controllers configured to, in a case where the irradiation radiation dose satisfies predetermined condition corresponding to the selected state of the receptor fields notified by the notification device, output a signal for stopping irradiation.

Further features of the present invention will become apparent from the following description of exemplary embodiments with reference to the attached drawings.

DESCRIPTION OF THE EMBODIMENTS

Figure 1:
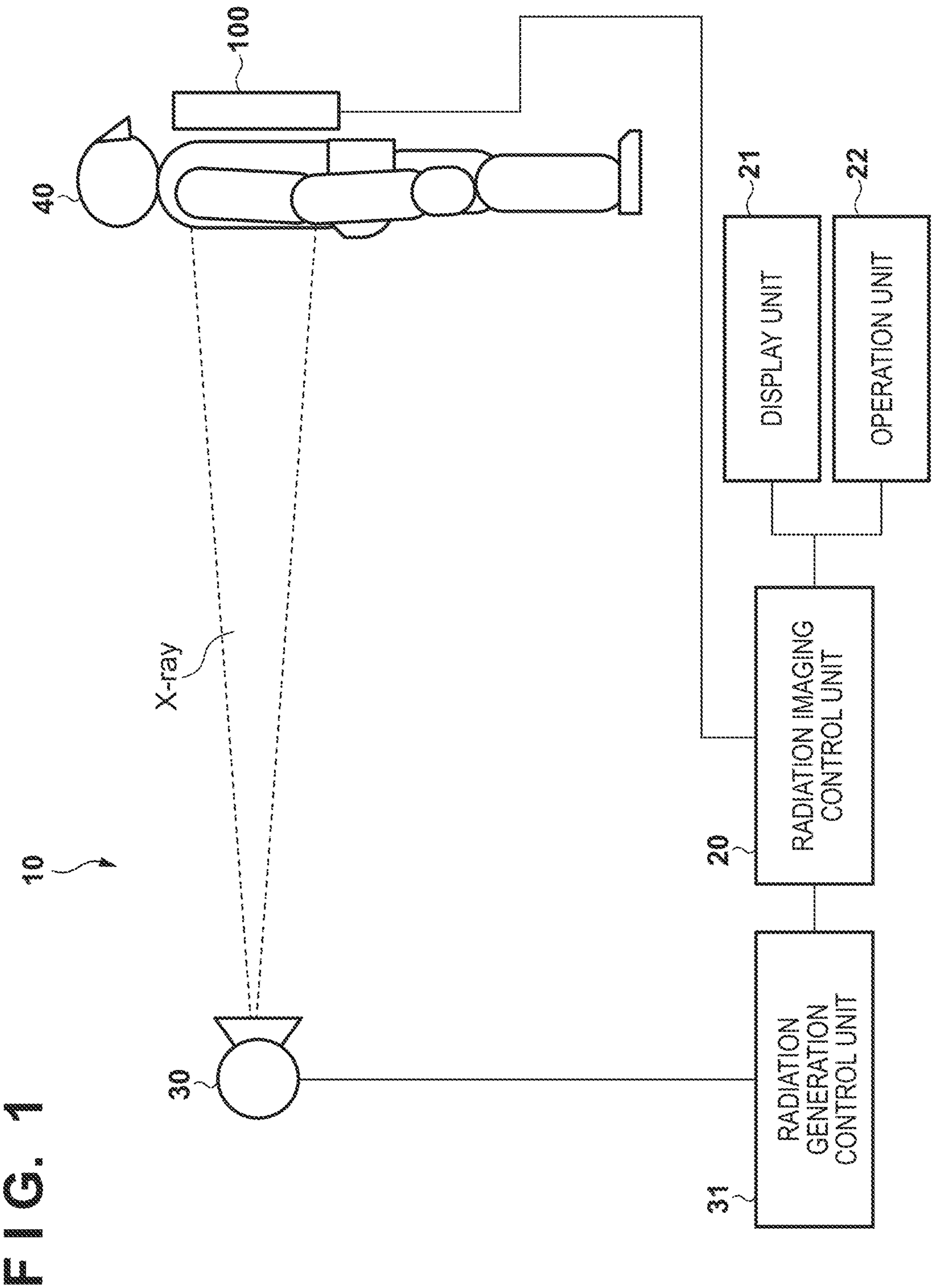
FIG. 1 is a schematic view of the arrangement of a radiation imaging system according to the first and fifth embodiments.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted. Note that details of dimensions and structures in each embodiment are not limited to those described in the specification and drawings. In this specification, the radiation includes not only an X-ray, but also an α-ray, a β-ray, a γ-ray, a particle beam, a cosmic ray, and the like.

First Embodiment (Arrangement of Radiation Imaging System)

First, a radiation imaging system according to the first embodiment will be described. FIG. 1 is a schematic view for explaining the arrangement of the radiation imaging system. A radiation imaging system 10 captures a radiation digital image (to be referred to as a captured image hereinafter). The radiation imaging system 10 performs inspection (imaging) based on an inspection order including pieces of inspection information. The inspection information includes imaging protocol information, and each imaging protocol defines parameter information or imaging execution information used at the time of imaging, image processing, or the like, and imaging environment information such as a sensor type or imaging posture. The inspection information includes information specifying an inspection order such as an inspection ID and a reception number, and information specifying a captured image compliant with the inspection order.

The radiation imaging system 10 includes a radiation imaging apparatus 100, a radiation generation control unit 31, a radiation imaging control unit 20, a display unit 21, an operation unit 22, and a radiation source 30. The radiation source 30 functions as a radiation generation unit. In this embodiment, the radiation source 30 is, for example, an X-ray tube and irradiates a subject 40 (that is, an object) with radiation (X-ray here).

The radiation generation control unit 31 controls generation of radiation based on an imaging protocol under the control of the radiation imaging control unit 20. More specifically, the radiation generation control unit 31 applies a voltage to the radiation source 30 to generate radiation in accordance with imaging conditions (for example, parameters such as a tube current, a tube voltage, and an irradiation time) corresponding to the imaging protocol.

The radiation imaging control unit 20 performs overall control of radiation imaging processing based on an imaging protocol. Also, the radiation imaging control unit 20 performs image processing on a captured image obtained from the radiation imaging apparatus 100. The image processing includes, for example, gradation processing and frequency processing. The image processing is performed using image processing parameters complying with an imaging protocol.

The display unit 21 displays, to the user, information such as a system state in the radiation imaging system 10. The display unit 21 can be, for example, a display. The display unit 21 can display, for example, an externally received inspection order or an inspection order created by the user of the radiation imaging apparatus 100. The operation unit 22 obtains an instruction from the user. The operation unit 22 can be, for example, a keyboard, a mouse, or various buttons. For example, the user can input an operation instruction to the radiation imaging apparatus 100 via the operation unit 22.

The radiation imaging apparatus 100 detects radiation transmitting through the subject 40 as charges equivalent to a transmitted radiation dose, generates a captured image as image data, and transfers the captured image to the radiation imaging control unit 20.

(AEC Function)

Next, the AEC function that implements proper irradiation of the subject 40 will be explained. The radiation imaging apparatus according to this embodiment has a plurality of receptor fields (receptor field candidates) capable of monitoring an irradiation radiation dose. In accordance with an imaging protocol, the radiation imaging control unit 20 decides (selects) at least one receptor field used in radiation imaging from a plurality of receptor fields (receptor field candidates) in the radiation imaging apparatus 100. That is, the radiation imaging control unit 20 decides, in accordance with an imaging protocol, which pixel region of the radiation imaging apparatus 100 is used to manage an irradiation radiation dose. Note that at least one receptor field used in radiation imaging can also be decided (selected) in accordance with an input from the user using the operation unit 22, in addition to protocol information.

In accordance with the imaging protocol, the radiation imaging control unit 20 decides a dose threshold at which irradiation from the radiation source 30 is stopped. Note that the dose threshold may be decided in accordance with an input from the user using the operation unit 22.

After the radiation imaging control unit 20 decides at least one receptor field used in radiation imaging, the radiation generation control unit 31 generates radiation from the radiation source 30 under the control of the radiation imaging control unit 20. The radiation imaging apparatus 100 always monitors an irradiation radiation dose (dose of radiation transmitting through the subject 40) in the receptor field used, that is, a dose of radiation reaching the receptor field of the radiation imaging apparatus 100.

When the dose of radiation reaching the receptor field of the radiation imaging apparatus 100 reaches a set dose threshold, the radiation imaging apparatus 100 transmits to the radiation imaging control unit 20 a signal (irradiation stop signal) for stopping irradiation. The radiation generation control unit 31 stops the irradiation of the radiation source 30 under the control of the radiation imaging control unit 20 that has received the irradiation stop signal. The irradiation radiation dose to the selected receptor field is managed to be a predetermined dose under the control of the radiation imaging control unit 20 and radiation generation control unit 31, and proper irradiation to the subject 40 can be implemented.

(Detailed Description of Radiation Imaging Apparatus 100)

Figure 2:
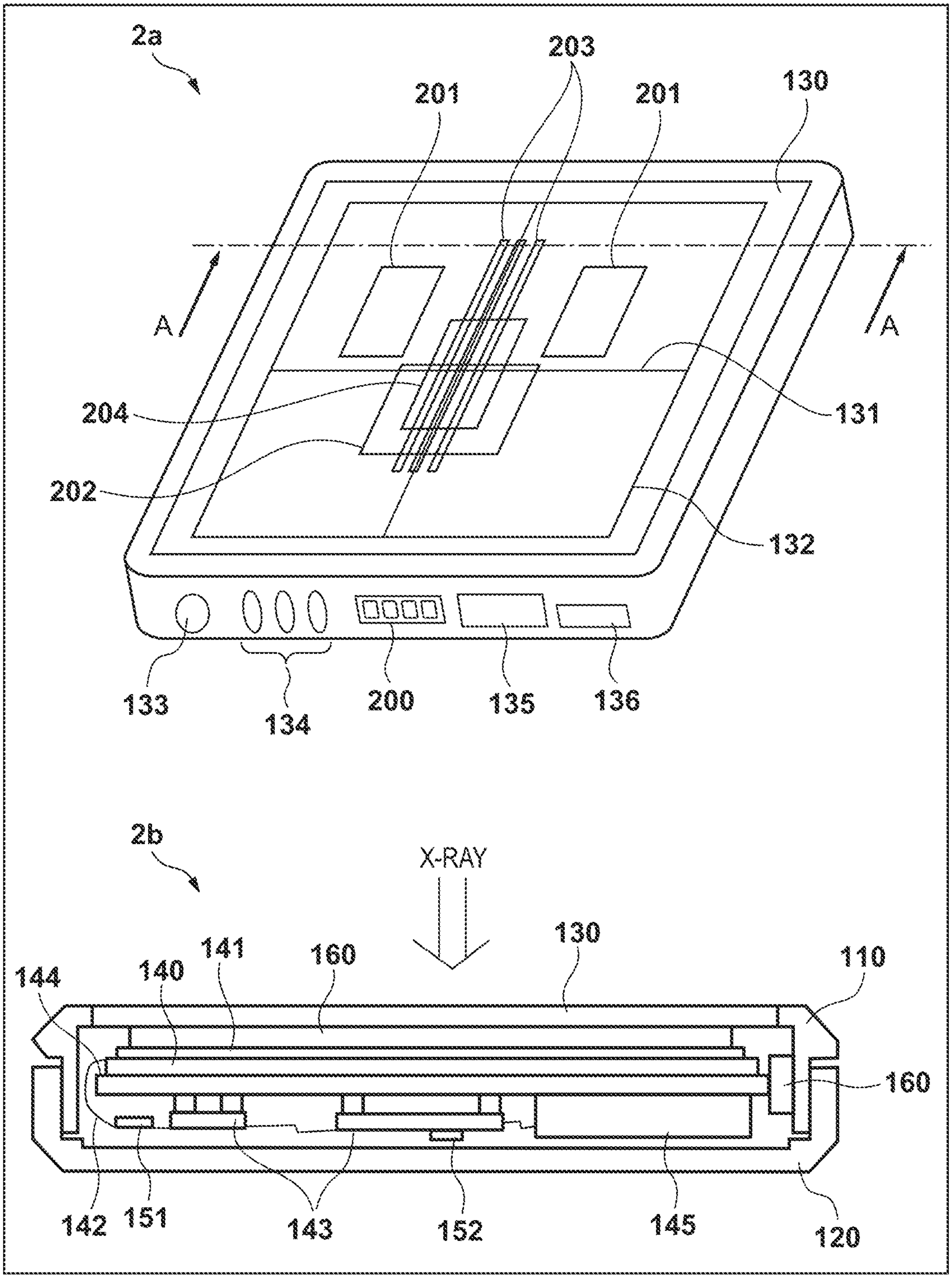
FIG. 2 shows a perspective view 2*a* of a radiation imaging apparatus when viewed from the radiation incident surface, and a sectional view 2*b* of 2*a* taken along a line A-A.

Next, details of the radiation imaging apparatus 100 will be explained with reference to FIG. 2. In FIG. 2, 2*a* is a perspective view of the radiation imaging apparatus 100 when viewed from the radiation incident surface, and 2*b* in FIG. 2 is a sectional view of 2*a* in FIG. 2 taken along a line A-A.

The housing of the radiation imaging apparatus 100 includes a front housing 110, a rear housing 120, and a radiation transmitting plate 130. A low-density material such as aluminum, magnesium, or CFRP is used for the front housing 110 and the rear housing 120 for the purpose of weight saving aiming to ensure the strength against falling, a shock, and the like, and reduce a load at the time of transportation.

For example, CFRP or the like is used for the radiation transmitting plate 130. The center of reading of a sensor panel 140, indices 131 and 132 capable of identifying a reading range, and a plurality of regions serving as predetermined receptor field candidates are drawn on the radiation transmitting plate 130. In the example of 2*a* of FIG. 2, region indices 201, 202, 203, and 204 representing four regions are drawn as a plurality of regions serving as receptor field candidates.

A switch 133, a state display portion 134, a wireless communication portion 135, a wired communication connection portion 136, and a receptor field information notifying portion 200 are provided on the side surface of the radiation imaging apparatus 100. The receptor field information notifying portion 200 announces at least one receptor field used in radiation imaging from a plurality of receptor fields capable of monitoring an irradiation radiation dose. The radiation imaging apparatus 100 incorporates a battery 145. The battery 145 is configured to be easily detachable so that it can be replaced with a charged battery when the remaining battery amount is small. The radiation imaging apparatus 100 performs an imaging operation using power supplied from the battery 145, and communicates with the radiation imaging control unit 20 via the wireless communication portion 135 so that it can be used in the wireless state. For example, when the wireless connection state is unstable, a cable (not shown) may be connected to the wired communication connection portion 136 to perform communication by wire. Also, when the remaining amount of the battery 145 is short, power can be supplied by wire.

The switch 133 can be used for the power-on/off operation of the radiation imaging apparatus 100, the switching operation of an imaging possible/impossible state (ready state), and the like. The state display portion 134 displays the power-on/off state, the remaining amount of the battery 145, the imaging possible/impossible state (ready state), and the like by the color or lighting/blinking/lights-out state of light and the like.

After the radiation imaging apparatus 100 is turned on, it checks the output characteristic of the sensor panel 140 and performs preparatory driving of the sensor panel 140 until the output characteristic of the sensor panel 140 is stabilized. The state display portion 134 displays a driving status representing that imaging is impossible until the output characteristic of the sensor panel 140 is stabilized, and after the output characteristic of the sensor panel 140 is stabilized, displays a driving status representing that imaging is possible. The user can confirm the state of the radiation imaging apparatus 100 on the display of the state display portion 134.

The sensor panel 140 constituted by forming photoelectric conversion elements on a glass substrate is arranged inside the radiation imaging apparatus 100. A phosphor 141 that converts radiation into visible light is arranged on a surface of the sensor panel 140 on the photoelectric conversion element side. As the phosphor, cesium iodide (CsI) or the like is used for the phosphor 141. The phosphor 141 emits light in response to radiation emitted to the radiation imaging apparatus 100, and the photoelectric conversion elements of the sensor panel 140 convert the light into a charge signal. The charge signal is used in image formation. Note that the method of converting radiation into charges is not limited to the above-described one and, for example, a direct conversion sensor that directly converts radiation of a-Se or the like into charges may be used.

The charge signal generated by the sensor panel 140 is output via a flexible board 142 to an integrated circuit 151 mounted on the flexible board 142. The integrated circuit 151 amplifies the charge signal, A/D-converts it, and converts the charge signal into a digital image signal. The digital image signal is further processed by an integrated circuit 152 mounted on an electric circuit board 143, and transferred to the radiation imaging control unit 20. In addition to processing of the digital image signal, the integrated circuit 152 (control circuit) has various functions such as driving processing of the radiation imaging apparatus 100, notification control of the receptor field information notifying portion 200, control of charging, and processing of signals detected by various sensors provided in the radiation imaging apparatus 100.

When the AEC function is used, the integrated circuit 152 monitors a charge signal (dose reaching a receptor field) generated in a predetermined region of the sensor panel 140 based on receptor field information from the radiation imaging control unit 20. When the integrated circuit 152 detects that the charge signal reaches a predetermined value or more, it transmits to the radiation imaging control unit 20 a signal for stopping irradiation. The sensor panel 140 of the radiation imaging apparatus 100 includes a plurality of two-dimensionally arrayed radiation detection pixels. The integrated circuit 152 (control circuit) monitors a dose reaching some pixels selected as at least one receptor field used in radiation imaging among the plurality of radiation detection pixels. When the dose reaching the receptor field announced by the receptor field information notifying portion 200 becomes equal to or higher than a dose threshold, the integrated circuit 152 (control circuit) outputs a signal for stopping irradiation.

A rigid base 144 is bonded to a surface of the sensor panel 140 opposite to the radiation incident surface so as not to cause a deformation and a crack by an external load, vibrations at the time of transportation, and the like. If necessary, a radiation shielding member (not shown) may be attached to the base 144 to, for example, suppress radiation deterioration of the electric circuit board 143 and reduce scattered radiation from behind the radiation imaging apparatus 100. The radiation shielding member can be formed from, for example, a high-density material such as molybdenum, iron, or lead. A cushioning material 160 is properly provided between the housing of the radiation imaging apparatus 100 and each internal member, and obtains an external load distribution effect and a cushioning effect against a shock. The cushioning material 160 can be, for example, a silicon or urethane foamed material or a material made of silicone gel or the like.

(Example of Imaging Sequence in Radiation Imaging)

Figure 3:
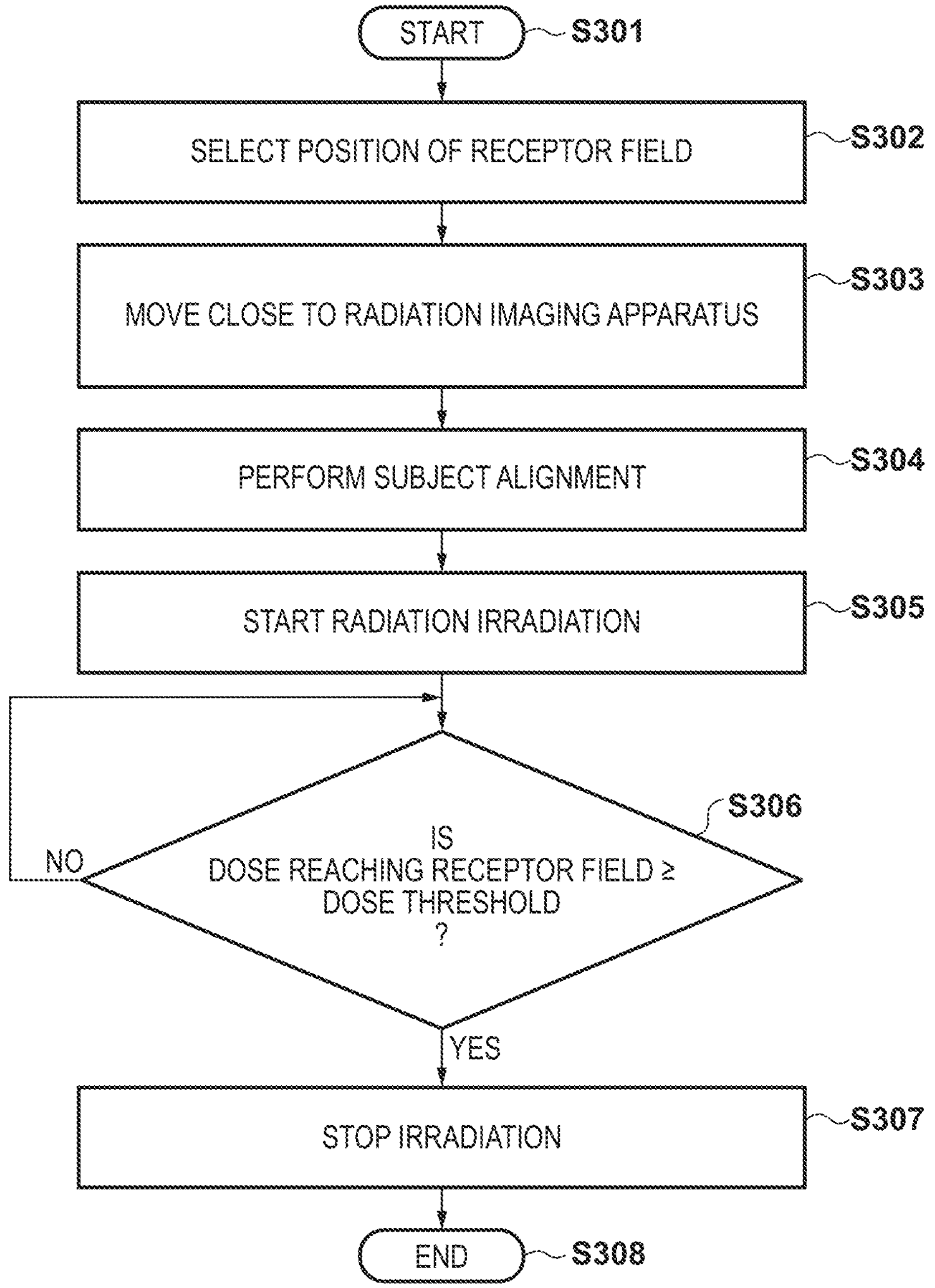
FIG. 3 is a flowchart showing an imaging sequence in radiation imaging using an AEC function.
Figure 4:
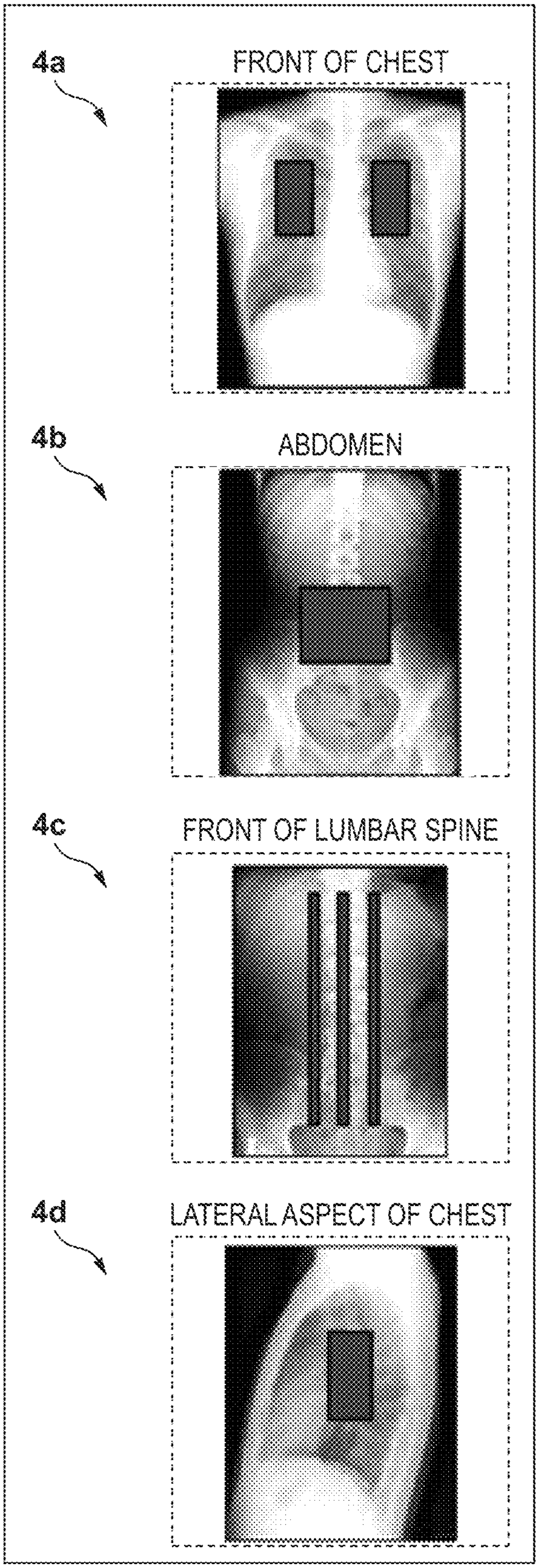
FIG. 4 shows an example of images representing alignment of a subject in imaging using each selected receptor field.
Figure 5:
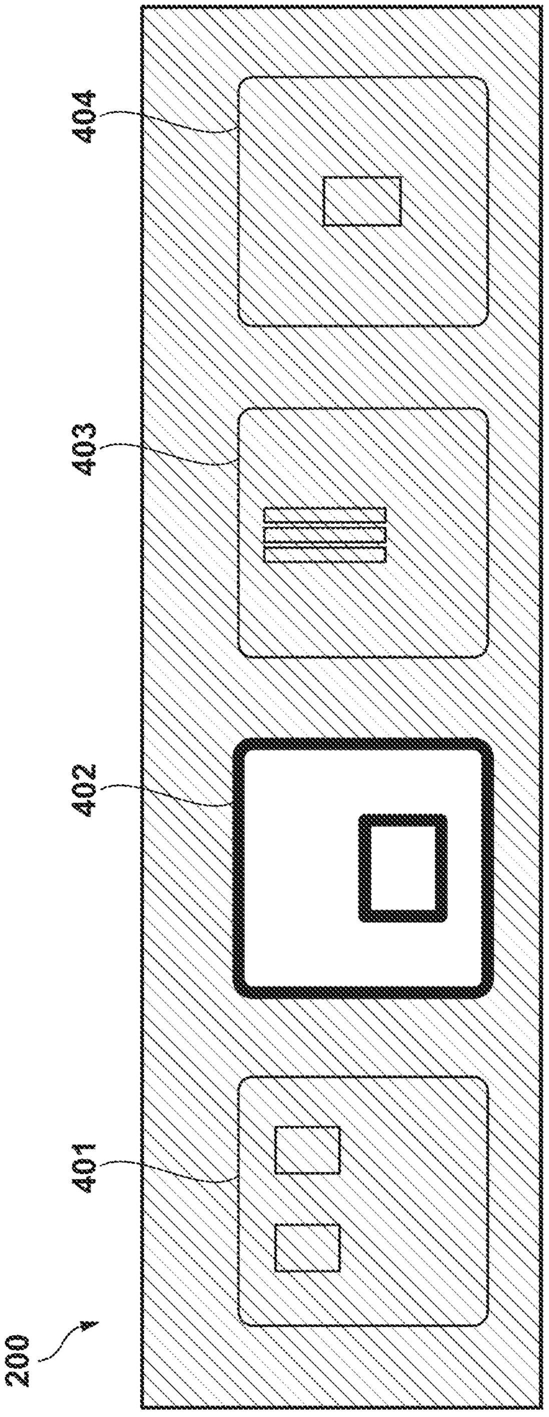
FIG. 5 is a view showing a receptor field information notifying portion provided on the radiation imaging apparatus.

Next, an imaging sequence in radiation imaging using the AEC function, particularly, a sequence in positioning an object will be explained with reference to FIGS. 3, 4, and 5. FIG. 3 is a flowchart showing an imaging sequence in radiation imaging using the AEC function. FIG. 4 shows an example of images representing alignment of a subject in imaging using each selected receptor field. FIG. 5 is a view showing the receptor field information notifying portion 200 provided on the radiation imaging apparatus 100.

At the time of imaging using the AEC function, the position (region) of a receptor field used in imaging is selected from a plurality of receptor field candidates in accordance with protocol information or an input from the user (step S302). At this time, the user can confirm a selected receptor field on the display unit 21 of the radiation imaging control unit 20.

Then, the user moves close to the radiation imaging apparatus 100 (step S303), and performs alignment between the subject 40 and the radiation imaging apparatus 100 (step S304). In FIG. 4 showing an example of alignment, 4*a* of FIG. 4 shows an image representing an example of alignment of the subject at the time of imaging the front of the chest, and 4*b* of FIG. 4 shows an image representing an example of alignment of the subject at the time of imaging the abdomen. Also, 4*c* of FIG. 4 shows an image representing an example of alignment of the subject at the time of imaging the front of the lumbar spine, and 4*d* of FIG. 4 shows an image representing an example of alignment of the subject at the time of imaging the lateral aspect of the chest. When performing radiation imaging as shown in FIG. 4, the integrated circuit 152 (control circuit) changes the notification of the receptor field information notifying portion 200 in accordance with the target imaging region of the subject.

The user recognizes a receptor field selected in accordance with protocol information or an input from the user, and needs to align the target imaging region with the position of the selected receptor field so that excessive irradiation and under-irradiation by imaging in an erroneous receptor field does not occur in the target imaging region.

In general, the radiation imaging apparatus 100 is arranged in a room shielded not to leak radiation externally, and the radiation imaging control unit 20 and the display unit 21 are arranged outside the shielded room. The user who aligns a subject inside the shielded room cannot confirm receptor field information displayed on the display unit 21.

The notification (display) of the receptor field information notifying portion 200 provided on the radiation imaging apparatus 100 corresponds to the display of receptor field information of the display unit 21. The user can visually check the receptor field information notifying portion 200 to recognize receptor field information and align the target imaging region with the position of the receptor field.

As shown in FIG. 5, the receptor field information notifying portion 200 presents such a display that the user can recognize a selected one of predetermined receptor field candidates.

The receptor field information notifying portion 200 includes selection information display portions corresponding to respective regions serving as receptor field candidates. More specifically, selection information display portions 401, 402, 403, and 404 corresponding to respective regions (for example, four regions) serving as receptor field candidates are provided inside the receptor field information notifying portion 200. The selection information display portions 401 to 404 correspond to the region indices 201 to 204 shown in 2*a* of FIG. 2. For example, the selection information display portion 401 corresponds to the region index 201 shown in 2*a* of FIG. 2, the selection information display portion 402 corresponds to the region index 202, the selection information display portion 403 corresponds to the region index 203, and the selection information display portion 404 corresponds to the region index 204.

By lighting only a selection information display portion corresponding to a receptor field selected in accordance with protocol information or an input from the user, the user can visually recognize the selected one of the receptor fields. FIG. 5 shows a display example in which the selection information display portion 402 is lighted. The user checks this lighting state and aligns the target imaging region of the abdomen of the subject 40 with the position of the region index 202. The user can align the target imaging region of the abdomen of the subject 40 with the irradiation field of the region index 202.

Note that the receptor field information notifying portion 200 suffices to have a function of presenting a selected receptor field. For example, a selected receptor field may be displayed by switching the color, or displayed on the display or the like. Alternatively, a receptor field may be announced by sound. For example, the receptor field information notifying portion 200 may announce at least one receptor field used in radiation imaging by using, as a display capable of identifying the respective receptor fields, at least one display among a numeral, a graphic symbol, a color, and an array of receptor fields within the incident surface of radiation. Also, the receptor field information notifying portion 200 may announce at least one receptor field used in radiation imaging by sound capable of identifying the respective receptor fields.

The arrangement of the receptor field information notifying portion 200 is not limited to the side surface of the radiation imaging apparatus 100, and the receptor field information notifying portion 200 may be provided on the radiation incident surface of the radiation imaging apparatus 100 or a surface opposing the radiation incident surface. Note that a grid may be mounted on the radiation incident surface to reduce scattered radiation, or the surface opposing the radiation incident surface may be covered with a fixed base or the like, which may influence the visibility. However, the visibility at the time of alignment can be ensured by providing the receptor field information notifying portion 200 on the side surface of the radiation imaging apparatus 100. Receptor field information notifying portions 200 can also be provided at a plurality of portions including the side surface of the radiation imaging apparatus 100. In alignment work of a target imaging region, the user can visually recognize a selected receptor field by visually checking the receptor field information notifying portion 200 arranged at an easy-to-see position in accordance with the use form of the radiation imaging apparatus 100.

After alignment is performed, irradiation is started by a user operation (step S305). The integrated circuit 152 sets a receptor field announced by the receptor field information notifying portion 200 as a monitoring target, and monitors a dose reaching the receptor field. More specifically, the integrated circuit 152 repetitively performs a comparison operation between the dose reaching the monitoring target receptor field and a dose threshold set in receptor field information (step S306). If the integrated circuit 152 determines that the dose reaching the monitoring target receptor field becomes equal to or higher than the set dose threshold, it transmits to the radiation imaging control unit 20 a signal (irradiation stop signal) for stopping irradiation. The radiation generation control unit 31 stops the irradiation of the radiation source 30 under the control of the radiation imaging control unit 20 that has received the irradiation stop signal (step S307).

According to this embodiment, the user confirms the notification of the receptor field information notifying portion 200 provided on the radiation imaging apparatus 100, and easily confirms a receptor field region with which a target imaging region is aligned. This can reduce the possibility of excessive irradiation and under-irradiation caused by erroneous alignment. According to this embodiment, an irradiation radiation dose to a selected receptor field region is managed to be a predetermined dose, and proper irradiation to a subject can be implemented.

Second Embodiment

In the second embodiment, a highly user-friendly portable radiation imaging apparatus among radiation imaging apparatuses having the AEC function will be described. The portable radiation imaging apparatus to be described in this embodiment is highly flexible in usage and has a plurality of general-purpose receptor field choices. One or more receptor fields can be selected from the receptor field choices to decide receptor fields optimum for various imaging operations.

Figure 6:
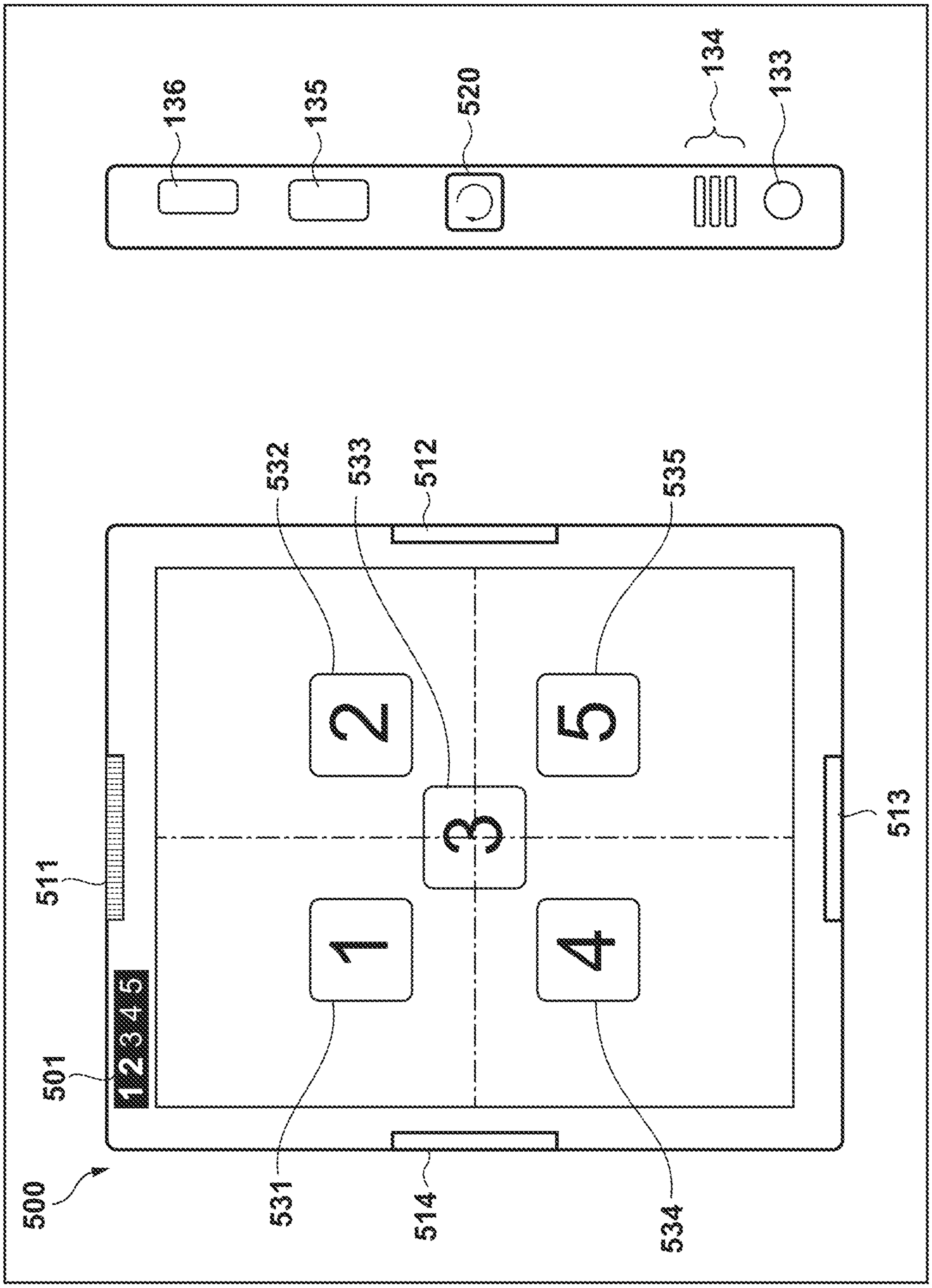
FIG. 6 is a view showing a radiation imaging apparatus according to the second and sixth embodiments.

FIG. 6 is a view showing a radiation imaging apparatus 500 according to the second embodiment. The radiation imaging apparatus 500 has five receptor field choices as a plurality of receptor fields (receptor field candidates) capable of monitoring an irradiation radiation dose. Displays (receptor field indices 531 to 535) representing respective receptor fields are provided on the radiation incident surface. Numerals "1" to "5" are printed on the respective indices so that the user can identify the respective indices. The respective receptor field choices will be referred to as a region 1, region 2, region 3, region 4, and region 5 in the order of numerals shown in FIG. 6.

At the time of use, the user confirms the notification of a receptor field information notifying portion 501 provided on the radiation imaging apparatus 500. By confirming the notification of the receptor field information notifying portion 501, the user can easily confirm a receptor field region with which a target imaging region is aligned. An integrated circuit 152 sets a receptor field announced by the receptor field information notifying portion 501 as a monitoring target, and monitors a dose reaching the monitoring target receptor field. According to this embodiment, in alignment, the user selects at least one receptor field from the five receptor field choices, and the integrated circuit 152 sets the receptor field announced by the receptor field information notifying portion 501 as a monitoring target and monitors a radiation dose irradiating the monitoring target receptor field, thereby implementing the AEC function. When a plurality of irradiation field regions are used as monitoring target receptor field regions from the five receptor field choices, the integrated circuit 152 can obtain pieces of dose information such as a maximum irradiation amount, an average irradiation amount, and a median based on the radiation doses of the irradiation field regions, select a piece of dose information from the obtained pieces of dose information, and perform comparative determination with a dose threshold.

An irradiation field region can be selected based on the target imaging region of a subject 40. For example, when imaging the front of the chest, there can be a use method of aligning two, upper right and upper left irradiation field regions with the target imaging regions (lungs) of the subject 40 and then imaging the target imaging regions. When the radiation imaging apparatus 500 is used in an orientation shown in FIG. 6, the region 1 (receptor field index 531) and the region 2 (receptor field index 532) are used as two, upper right and upper left irradiation field regions.

The radiation imaging apparatus 500 according to this embodiment includes the receptor field information notifying portion 501. The user can visually check the receptor field information notifying portion 501 to recognize receptor field information and align a target imaging region with the position of a receptor field.

At this time, a selected region number is displayed on the receptor field information notifying portion 501 so that the user can recognize a selected receptor field. More specifically, the user is notified of the selected receptor field by lighting the selected region number while extinguishing unselected region numbers. In the receptor field information notifying portion 501 shown in FIG. 6, "1" representing the region 1 and "2" representing the region 2 are lighted while the remaining region numbers are extinguished.

Note that the selected receptor field region notifying method is not limited to this, and the receptor field information notifying portion 501 suffices to have a function of presenting a selected receptor field. For example, a selected receptor field may be displayed by switching the color, or displayed on the display or the like. Alternatively, a receptor field may be announced by sound.

When the portable radiation imaging apparatus 500 is used, it is conceivable that the user uses the radiation imaging apparatus 500 in various orientations. For example, in FIG. 6, the regions 1 and 2 are positioned upper right and upper left in the vertical direction (direction of gravity). It is also possible to rotate the radiation imaging apparatus 500 by 180° and use the regions 4 and 5 as upper right and upper left regions in the vertical direction (direction of gravity). To do this, the radiation imaging apparatus 500 can have an orientation detection function of automatically recognizing an orientation so that the user can use the radiation imaging apparatus 500 without paying attention to the orientation of the radiation imaging apparatus 500. For example, the orientation detection function of detecting the orientation of the radiation imaging apparatus 500 in the direction of gravity by detecting the direction of gravity by an acceleration sensor or detecting a moving amount or a rotation angle by a combination with a gyrosensor can be implemented.

In the radiation imaging apparatus 500 according to this embodiment, the integrated circuit 152 (control circuit) can control the notification of the receptor field information notifying portion 501 by using the orientation detection function. The integrated circuit 152 (control circuit) changes the notification of the receptor field information notifying portion 501 based on the detection result of a change of the orientation of the radiation imaging apparatus 500 in the vertical direction. For example, when the regions 1 and 2 are set (selected) in receptor field information, the integrated circuit 152 detects (determines) the orientation of the radiation imaging apparatus 500 based on the detection result of the acceleration sensor or the like. The integrated circuit 152 determines on which of the upper side of the radiation imaging apparatus 500 in the vertical direction and the lower side in the vertical direction, irradiation field regions corresponding to the regions 1 and 2 are positioned. For example, when the irradiation field regions corresponding to the regions 1 and 2 are positioned on the upper side of the radiation imaging apparatus 500 in the vertical direction, the integrated circuit 152 determines that the orientation has not been changed from the setting of the receptor field information. In this case, under the control of the integrated circuit 152, the receptor field information notifying portion 501 announces the regions 1 and 2 as regions used in radiation imaging without changing the setting (regions 1 and 2) of the receptor field information.

On the other hand, when the irradiation field regions corresponding to the regions 1 and 2 are positioned on the lower side of the radiation imaging apparatus 500 in the vertical direction, the integrated circuit 152 determines that the orientation has been changed from the setting of the receptor field information. In this case, under the control of the integrated circuit 152, the receptor field information notifying portion 501 changes the setting (regions 1 and 2) of the receptor field information and announces, as regions used in radiation imaging, the regions 4 and 5 positioned on the upper side of the radiation imaging apparatus 500 in the vertical direction.

More specifically, when the radiation imaging apparatus 500 is used in the orientation shown in FIG. 6 (in the case where the orientation is not changed), the receptor field information notifying portion 501 announces "1" representing the region 1 and "2" representing the region 2. By confirming the notification of the receptor field information notifying portion 501, the user can select the regions 1 and 2 and align a target imaging region without determining the orientation.

In contrast, when the user rotates the radiation imaging apparatus 500 by 180° and uses it (in the case where the orientation is changed), the receptor field information notifying portion 501 announces "4" representing the region 4 and "5" representing the region 5 in accordance with the change of the orientation. By confirming the notification of the receptor field information notifying portion 501, the user can select the regions 4 and 5 and align a target imaging region without determining the orientation. The notification of the receptor field information notifying portion 501 can be controlled using the orientation detection function. This can implement an automatic rotation function for the receptor field position that automatically notifies the user of the regions 4 and 5 upon 180° rotation instead of the notification of the regions 1 and 2.

When the orientation of the radiation imaging apparatus 500 is changed, the radiation imaging apparatus 500 preferably has even an orientation detection state notifying function in addition to the receptor field information notifying portion 501 for higher user friendliness. The radiation imaging apparatus 500 according to this embodiment includes a plurality of orientation notifying portions 511 to 514 that announce the orientation of the radiation imaging apparatus 500. The integrated circuit 152 changes the notifications of the orientation notifying portions 511 to 514 based on the detection result of a change of the orientation of the radiation imaging apparatus 500 in the vertical direction. As shown in FIG. 6, the radiation imaging apparatus 500 according to this embodiment includes the orientation notifying portions 511 to 514 near respective side surfaces, and announces the orientation detection state by lighting an orientation notifying portion arranged near a side surface recognized as the upper portion.

The integrated circuit 152 detects (determines) the orientation of the radiation imaging apparatus 500 based on the detection result of an orientation detector such as an acceleration sensor. The integrated circuit 152 controls to light, out of the orientation notifying portions 511 to 514, an orientation notifying portion arranged near a side surface that is determined to be positioned at the upper portion (upper side in the vertical direction) of the radiation imaging apparatus 500.

When the radiation imaging apparatus 500 is used in the orientation shown in FIG. 6, the integrated circuit 152 controls to light the orientation notifying portion 511 positioned at the upper portion (upper side in the vertical direction) of the radiation imaging apparatus 500. When no orientation detection function is used, the integrated circuit 152 may control to extinguish all the orientation notifying portions so as to announce that the automatic rotation function is not used. Note that the orientation notifying method is not limited to this. For example, an orientation detection state may be announced by displaying, on the display of the radiation imaging apparatus 500, an arrow indicating a direction determined to be the upper portion (upper side in the vertical direction) of the radiation imaging apparatus 500.

When the radiation imaging apparatus 500 does not have the orientation detection function, a subject is generally aligned with a predetermined receptor field. However, for example, after the physique of the subject is confirmed at the time of alignment, the portrait/landscape orientation of the rectangular radiation imaging apparatus 500 may be changed by 90°. More specifically, when the radiation imaging apparatus 500 is planned to be used in the portrait orientation, but the physique of the subject is large and the subject protrudes in the lateral direction, the radiation imaging apparatus 500 is changed to be used in the portrait orientation. As an operation portion at this time, the radiation imaging apparatus 500 includes a rotation operation portion 520.

Figure 7:
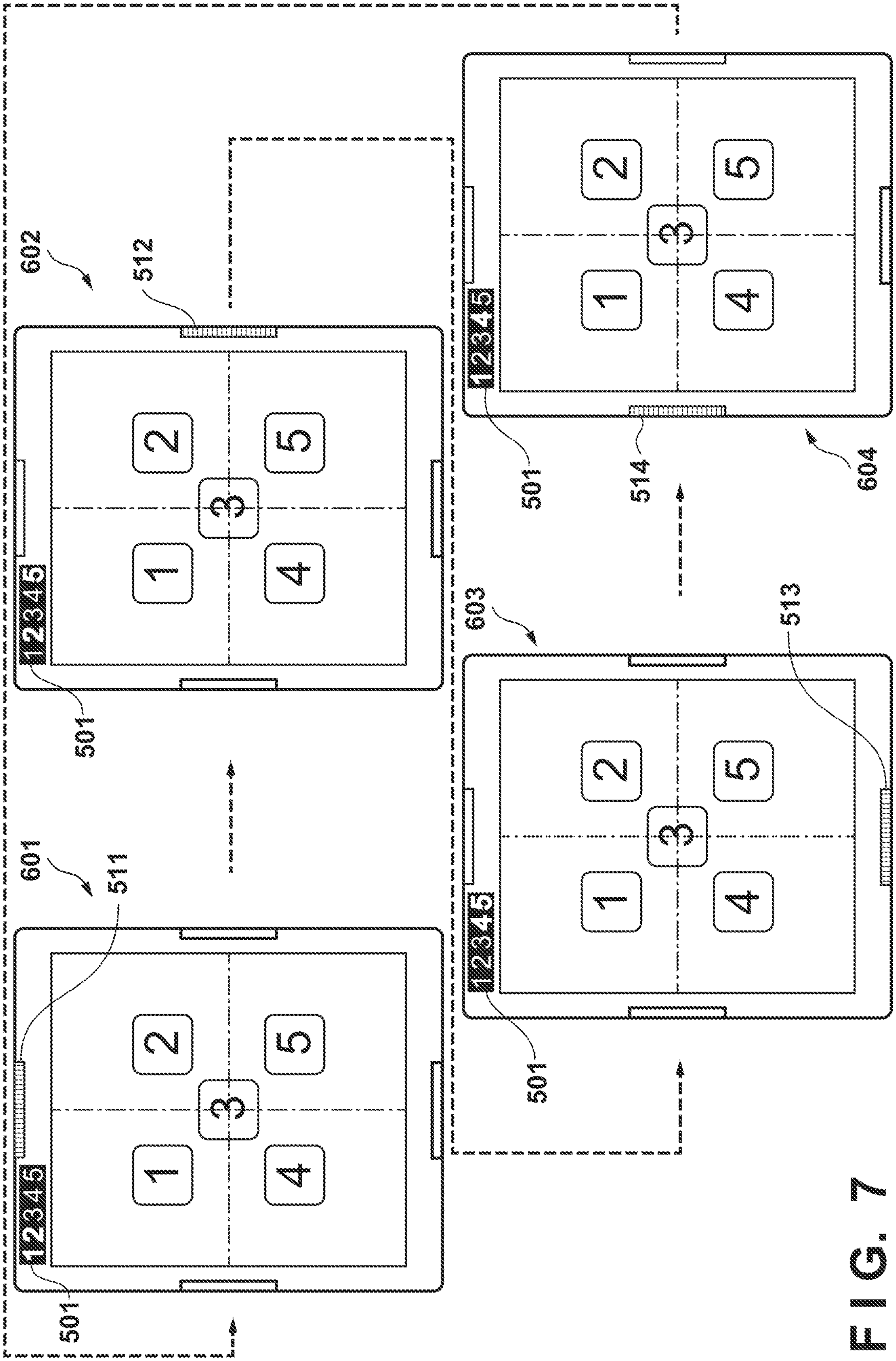
FIG. 7 is a view for explaining the operation of a radiation imaging apparatus 500 when a receptor field rotation operation portion according to the second and sixth embodiments is operated.

FIG. 7 is a view for explaining the operation of the radiation imaging apparatus 500 when the rotation operation portion 520 is operated. The radiation imaging apparatus 500 includes the orientation notifying portions 511 to 514 that announce the orientation of the radiation imaging apparatus, and the rotation operation portion 520 that changes the setting of the orientation of the radiation imaging apparatus 500 based on an operation input. The integrated circuit 152 changes the notifications of the orientation notifying portions 511 to 514 based on the setting of the orientation changed by the rotation operation portion 520.

The following description assumes a case where the regions 1 and 2 are set in advance as receptor fields in receptor field information, that is, it is set to define the orientation notifying portion 511 as the upper portion (upper side in the vertical direction) and use upper right and upper left receptor fields. This state will be referred to as a state 601. In the state 601, the orientation notifying portion 511 is lighted, and the receptor field information notifying portion 501 announces "1" representing the preset region 1 and "2" representing the preset region 2.

If the user operates the rotation operation portion 520 in the state 601, the receptor field selection state is rotated by 90°, and the regions 2 and 5 that become upper right and upper left regions with the orientation notifying portion 512 serving as the upper portion (upper side in the vertical direction) are used (state 602). In the state 602, the orientation notifying portion 512 is lighted, and the receptor field information notifying portion 501 announces "2" representing the region 2 and "5" representing the region 5 in accordance with the change of the orientation.

Similarly, if the user operates again the rotation operation portion 520 in the state 602, the receptor field selection state is rotated by 90°, and the regions 4 and 5 that become upper right and upper left regions with the orientation notifying portion 513 serving as the upper portion (upper side in the vertical direction) are used (state 603). In the state 603, the orientation notifying portion 513 is lighted, and the receptor field information notifying portion 501 announces "4" representing the region 4 and "5" representing the region 5 in accordance with the change of the orientation.

Further, if the user operates again the rotation operation portion 520, the receptor field selection state is rotated by 90°, and the regions 1 and 4 that become upper right and upper left regions with the orientation notifying portion 514 serving as the upper portion (upper side in the vertical direction) are used (state 604). In the state 604, the orientation notifying portion 514 is lighted, and the receptor field information notifying portion 501 announces "1" representing the region 1 and "4" representing the region 4 in accordance with the change of the orientation.

If the user further operates the rotation operation portion 520, the state returns to the state 601. By operating the rotation operation portion 520, the user can easily change the receptor field selection state near the subject, improving the user friendliness. Note that not all the states 601 to 604 need to be changed, and an operation of only changing the states 601 and 602 is sufficient to change the portrait/landscape orientation.

The function of the rotation operation portion 520 may be mounted together with the automatic orientation detection function. When a manual rotation operation is performed with the rotation operation portion 520, the integrated circuit 152 can stop the operation of the automatic orientation detection function. Further, the integrated circuit 152 can control the orientation notifying portion to differ the color of notification light of the orientation notifying portions 511 to 514 by the manual operation of the rotation operation portion 520 from the color of notification light at the time of notification of an orientation by the automatic orientation detection function, so that an automatic orientation detection state or a manual orientation detection state can be identified.

According to this embodiment, the highly user-friendly portable radiation imaging apparatus having the AEC function can be provided.

Third Embodiment

In the third embodiment, the arrangement of a radiation imaging apparatus capable of monitoring an irradiation dose with a configuration in which receptor field regions are subdivided in comparison with those in the first and second embodiments and a receptor field region is selected in accordance with the physique of a subject, the distortion of the skeleton, and the like will be described.

Figure 8:
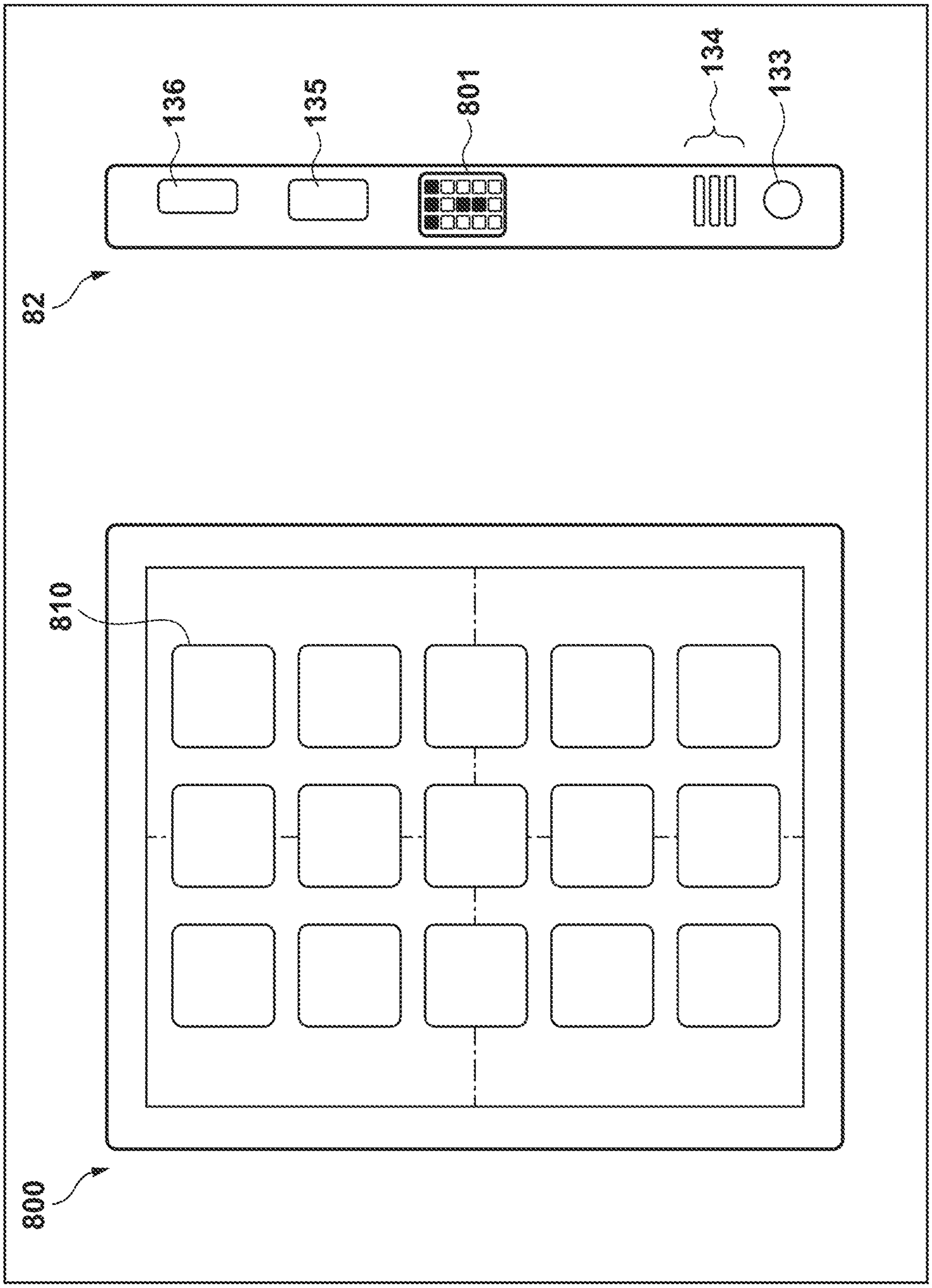
FIG. 8 is a view showing a radiation imaging apparatus according to the third and seventh embodiments.

FIG. 8 is a view showing a radiation imaging apparatus 800 according to the third embodiment. In FIG. 8, 800 is a plane view of the radiation imaging apparatus 800 on the radiation incident surface side, and 82 in FIG. 8 is a side view of the radiation imaging apparatus 800. As shown in 800 of FIG. 8, a plurality of receptor field choices 810 are provided on the entire radiation incident surface of the radiation imaging apparatus 800. As an arrangement example of the receptor field choices 810, 800 of FIG. 8 shows an example in which the receptor field choices 810 are arranged in 3×5 regions. However, receptor fields are not limited to this example and may be subdivided into a larger number of regions. Since the subdivided receptor field choices 810 are arranged in a wide range, arbitrary receptor fields can be selected in accordance with the physique of a subject, the distortion of the skeleton, and the like. As the receptor field selection method, any selection method can be used from the above-described method of automatic selection based on an imaging protocol, the method of manual selection by a user, and a method of selection based on the recognition result of position information of a subject immediately before imaging. The position information of a subject is information representing the position of a subject within a reading range 132 (within an imaging possible range) of a sensor panel 140. In the radiation imaging apparatus 800 according to this embodiment, an integrated circuit 152 (control circuit) selects a receptor field used in radiation imaging based on position information of a subject within the imaging possible range in the radiation imaging apparatus 800. A receptor field information notifying portion 801 announces the receptor field selected by the integrated circuit 152.

As an arrangement of obtaining the recognition result of a subject, for example, a camera provided on a radiation source 30 can be used. The radiation imaging apparatus 100 and the camera provided on the radiation source 30 can wirelessly communicate with each other via a wireless communication portion 135. The wireless communication portion 135 can obtain the recognition result of a subject recognized by the camera. Based on the recognition result of the subject obtained from the wireless communication portion 135, the integrated circuit 152 can specify information (position information of the subject) representing the position of the subject within the reading range 132 (within the imaging possible range) of the sensor panel 140.

The arrangement of obtaining the recognition result of a subject is not limited to the camera. The integrated circuit 152 may specify position information of a subject based on the recognition result of the state of contact with the subject by a pressure sensor or proximity sensor provided on the radiation incident surface of the radiation imaging apparatus 800.

The integrated circuit 152 selects a receptor field used in imaging based on position information of a subject. The integrated circuit 152 controls the receptor field information notifying portion 801 (82 in FIG. 8) provided on the radiation imaging apparatus 800, and the receptor field information notifying portion 801 notifies the user of the selected receptor field information. The receptor field information notifying portion 801 is, for example, a display and displays a receptor field selected as a receptor field used in imaging out of a plurality of receptor field choices. The user confirms a selection state in which a desired receptor field is selected, and then operates to start irradiation.

The receptor field information notifying portion 801 according to this embodiment can display both the selection state of a receptor field and position information of a subject obtained by the camera, the pressure sensor, the proximity sensor, or the like by display control of the integrated circuit 152. From the notification of the receptor field information notifying portion 801, the user can easily confirm whether the selection state of the receptor field is a desired state, and can easily confirm alignment between the subject and the receptor field.

The receptor field information notifying portion 801 may be formed from, for example, a touch panel display capable of changing a notification content (selection state of a receptor field) by the touch operation of the user. When the selection state of a receptor field displayed by the receptor field information notifying portion 801 is not a desired selection state, the user can change (switch) the selection state of each receptor field to the selection state of a desired receptor field by a touch operation.

In this manner, when the selection state of a receptor field is not a desired state, the user can switch the selection state of each receptor field by a touch operation and easily obtain the selection state of a desired receptor field.

According to this embodiment, alignment between a subject and a receptor field can be easily confirmed in the radiation imaging apparatus capable of freely selecting a receptor field in accordance with the physique of a subject, the distortion of the skeleton, and the like.

Fourth Embodiment

In the fourth embodiment, an arrangement in which even when a radiation imaging apparatus is built in a gantry or the like, receptor field selection information can be confirmed near a subject will be described. A portable radiation imaging apparatus is sometimes built in an upright gantry or the like and used. At this time, it may be hard to visually check a receptor field information notifying portion provided on the radiation imaging apparatus. Considering this, the arrangement of a radiation imaging apparatus in which a receptor field information notifying device 920 is newly provided outside the gantry will be explained in this embodiment. By announcing receptor field information by the receptor field information notifying device 920, the user can confirm receptor field information near a subject, that is, at the time of alignment of the subject.

Figure 9:
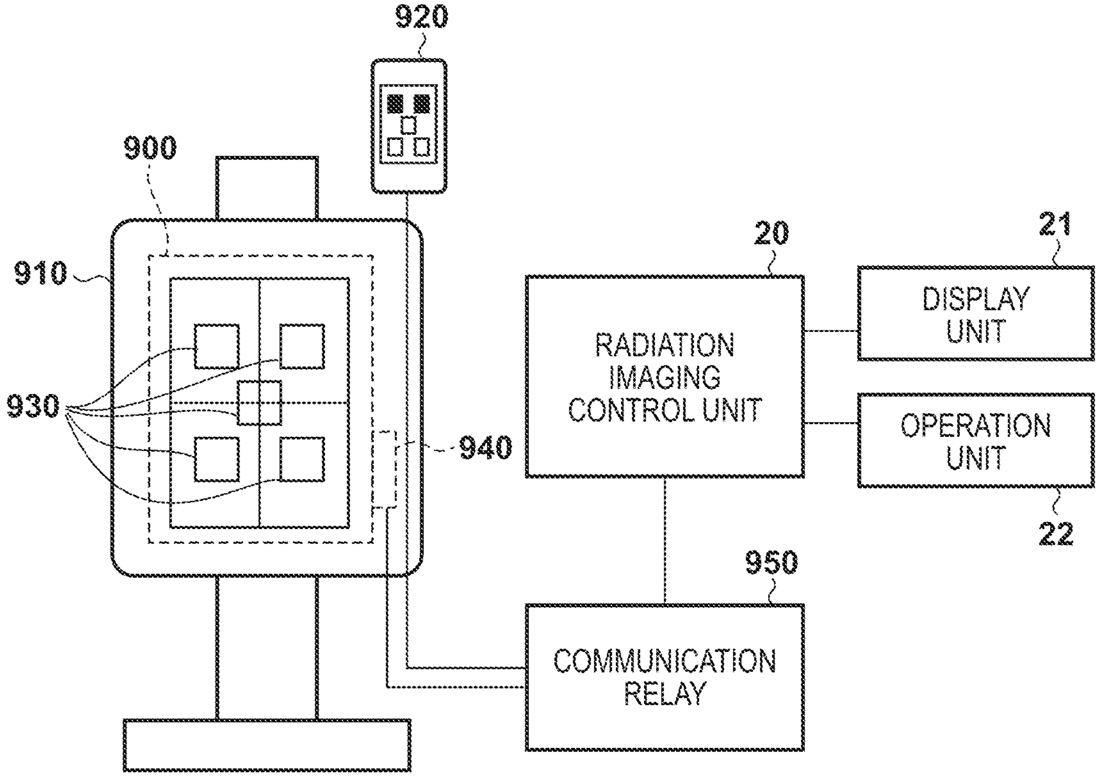
FIG. 9 is a view showing a radiation imaging system according to the fourth embodiment.

FIG. 9 is a view for explaining the arrangement of a radiation imaging apparatus 900 according to the fourth embodiment. The operation of the receptor field information notifying device 920 will be explained with reference to FIG. 9. The radiation imaging apparatus 900 according to this embodiment is built inside a gantry 910. The radiation imaging apparatus 900 is connected to a communication relay 950 via a wired connection connector 940. The receptor field information notifying device 920 is fixed outside the gantry 910 and connected to the communication relay 950. The communication relay 950 is connected to a radiation imaging control unit 20. With the arrangement according to this embodiment, the radiation imaging apparatus 900, the receptor field information notifying device 920, and the radiation imaging control unit 20 can communicate with each other.

The candidates of a plurality of receptor fields 930 can monitor irradiation radiation doses respectively. When at least one receptor field used in radiation imaging is selected from the receptor fields 930 in accordance with imaging protocol information or an operation by the user, the radiation imaging control unit 20 transmits receptor field information to the radiation imaging apparatus 900. The receptor field information is also transmitted to the receptor field information notifying device 920. Upon receiving the receptor field information, the receptor field information notifying device 920 announces receptor field information based on this information.

When the built-in orientation of the radiation imaging apparatus is regulated by the wired connection connector 940 or the like, only the above-mentioned information can provide a satisfactory notification. For a gantry in which the built-in orientation of the radiation imaging apparatus can be arbitrarily changed, information about an orientation in which the radiation imaging apparatus 900 is built in the gantry can be necessary for the notification of receptor field information. In such a case, for example, either information can be used from, for example, orientation information of the radiation imaging apparatus in the direction of gravity based on detection information in the direction of gravity by an acceleration sensor or the like provided in the radiation imaging apparatus 900, and orientation information of the radiation imaging apparatus in the direction of gravity based on detection information of various sensors or the like provided in the gantry. The orientation information of the radiation imaging apparatus by the acceleration sensor or the like provided in the radiation imaging apparatus 900 is input from the wired connection connector 940 to the receptor field information notifying device 920 via the communication relay 950. The orientation information of the radiation imaging apparatus by various sensors or the like provided in the gantry is input from a communication line (not shown) to the receptor field information notifying device 920 via the communication relay 950. The receptor field information notifying device 920 can control the notification content of receptor field information based on the orientation information of the radiation imaging apparatus in the direction of gravity.

According to this embodiment, even when the radiation imaging apparatus is built in the gantry or the like, receptor field information representing a receptor field selected as a receptor field used in radiation imaging can be easily confirmed near a subject by the notification of the receptor field information.

Fifth Embodiment (AEC Function)

The arrangement of a radiation imaging system according to the fifth embodiment is similar to the arrangement in FIG. 1 described in the first embodiment. The AEC function of implementing proper irradiation of a subject 40 will be explained. The radiation imaging apparatus according to this embodiment has a plurality of receptor fields (receptor field candidates) capable of monitoring an irradiation radiation dose. A radiation imaging control unit 20 decides (selects) at least one receptor field used in radiation imaging from the plurality of receptor fields (receptor field candidates) in a radiation imaging apparatus 100 in accordance with an imaging protocol. That is, the radiation imaging control unit 20 decides (selects), in accordance with an imaging protocol, which pixel region of the radiation imaging apparatus 100 is used to manage an irradiation radiation dose. Note that at least one receptor field used in radiation imaging can also be changed by an operation by the user using a receptor field information operation portion 210 (10*a* of FIG. 10) or an operation unit 22, in addition to the imaging protocol. By operating the receptor field information operation portion 210, the user can change the selection state of a receptor field selected in accordance with the imaging protocol. The user can operate the receptor field information operation portion 210 on the radiation imaging apparatus 100 side. When aligning a subject with a receptor field, the user can operate the receptor field information operation portion 210 to easily change the selection state of the receptor field.

In accordance with the imaging protocol, the radiation imaging control unit 20 decides a dose threshold at which irradiation from a radiation source 30 is stopped. Note that the dose threshold may be decided by an input from the user using the operation unit 22.

After the radiation imaging control unit 20 decides at least one receptor field used in radiation imaging, a radiation generation control unit 31 generates radiation from the radiation source 30 under the control of the radiation imaging control unit 20. The radiation imaging apparatus 100 always monitors an irradiation radiation dose (dose of radiation transmitting through the subject 40) in the receptor field used, that is, a dose of radiation reaching the receptor field of the radiation imaging apparatus 100.

When the dose of radiation reaching the receptor field of the radiation imaging apparatus 100 reaches a set dose threshold, the radiation imaging apparatus 100 transmits to the radiation imaging control unit 20 a signal (irradiation stop signal) for stopping irradiation. The radiation generation control unit 31 stops the irradiation of the radiation source 30 under the control of the radiation imaging control unit 20 that has received the irradiation stop signal. The irradiation radiation dose to the selected receptor field is managed to be a predetermined dose under the control of the radiation imaging control unit 20 and radiation generation control unit 31, and proper irradiation to the subject 40 can be implemented.

(Detailed Description of Radiation Imaging Apparatus 100)

Figure 10:
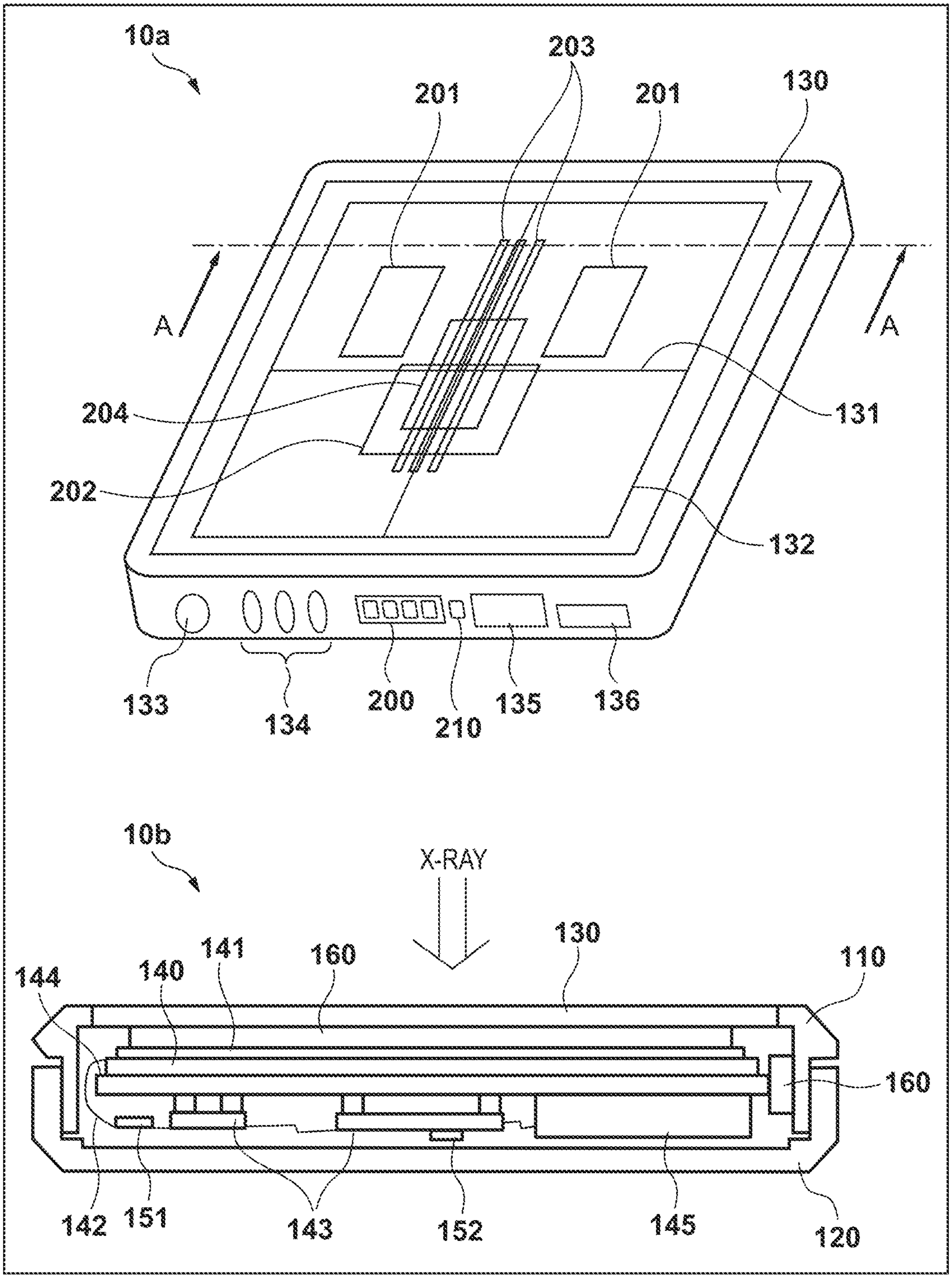
FIG. 10 shows a perspective view 10*a* of a radiation imaging apparatus when viewed from the radiation incident surface, and a sectional view 10*b* of 10*a* taken along a line A-A.

Next, details of the radiation imaging apparatus 100 will be explained with reference to FIG. 10. In FIG. 10, 10*a* is a perspective view of the radiation imaging apparatus 100 when viewed from the radiation incident surface, and 10*b* in FIG. 10 is a sectional view of 10*a* of FIG. 10 taken along a line A-A.

The housing of the radiation imaging apparatus 100 includes a front housing 110, a rear housing 120, and a radiation transmitting plate 130. A low-density material such as aluminum, magnesium, or CFRP is used for the front housing 110 and the rear housing 120 for the purpose of weight saving aiming to ensure the strength against falling, a shock, and the like, and reduce a load at the time of transportation.

For example, CFRP or the like is used for the radiation transmitting plate 130. The center of reading of a sensor panel 140, indices 131 and 132 capable of identifying a reading range, and a plurality of regions serving as predetermined receptor field candidates are drawn on the radiation transmitting plate 130. In the example of 10*a* of FIG. 10, region indices 201, 202, 203, and 204 representing four regions are drawn as a plurality of regions serving as receptor field candidates.

A switch 133, a state display portion 134, a wireless communication portion 135, a wired communication connection portion 136, a receptor field information notifying portion 200, and the receptor field information operation portion 210 are provided on the side surface of the radiation imaging apparatus 100.

The receptor field information notifying portion 200 announces, from a plurality of receptor fields capable of monitoring an irradiation radiation dose, a receptor field that is used in radiation imaging and changes depending on a target imaging region. The receptor field information operation portion 210 changes a receptor field that is selected from a plurality of receptor fields capable of monitoring an irradiation radiation dose and is used in radiation imaging.

The radiation imaging apparatus 100 incorporates a battery 145. The battery 145 is configured to be easily detachable so that it can be replaced with a charged battery when the remaining battery amount is small. The radiation imaging apparatus 100 performs an imaging operation using power supplied from the battery 145, and communicates with the radiation imaging control unit 20 via the wireless communication portion 135 so that it can be used in the wireless state. For example, when the wireless connection state is unstable, a cable (not shown) may be connected to the wired communication connection portion 136 to perform communication by wire. Also, when the remaining amount of the battery 145 is short, power can be supplied by wire.

The switch 133 can be used for the power-on/off operation of the radiation imaging apparatus 100, the switching operation of an imaging possible/impossible state (ready state), and the like. The state display portion 134 displays the power-on/off state, the remaining amount of the battery 145, the imaging possible/impossible state (ready state), and the like by the color or lighting/blinking/lights-out state of light and the like.

After the radiation imaging apparatus 100 is turned on, it checks the output characteristic of the sensor panel 140 and performs preparatory driving of the sensor panel 140 until the output characteristic of the sensor panel 140 is stabilized. The state display portion 134 displays a driving status representing that imaging is impossible until the output characteristic of the sensor panel 140 is stabilized, and after the output characteristic of the sensor panel 140 is stabilized, displays a driving status representing that imaging is possible. The user can confirm the state of the radiation imaging apparatus 100 on the display of the state display portion 134.

The sensor panel 140 constituted by forming photoelectric conversion elements on a glass substrate is arranged inside the radiation imaging apparatus 100. A phosphor 141 that converts radiation into visible light is arranged on a surface of the sensor panel 140 on the photoelectric conversion element side. As the phosphor, cesium iodide (CsI) or the like is used for the phosphor 141. The phosphor 141 emits light in response to radiation emitted to the radiation imaging apparatus 100, and the photoelectric conversion elements of the sensor panel 140 convert the light into a charge signal. The charge signal is used in image formation. Note that the method of converting radiation into charges is not limited to the above-described one and, for example, a direct conversion sensor that directly converts radiation of a-Se or the like into charges may be used.

The charge signal generated by the sensor panel 140 is output via a flexible board 142 to an integrated circuit 151 mounted on the flexible board 142. The integrated circuit 151 amplifies the charge signal, A/D-converts it, and converts the charge signal into a digital image signal. The digital image signal is further processed by an integrated circuit 152 mounted on an electric circuit board 143, and transferred to the radiation imaging control unit 20.

In addition to processing of the digital image signal, the integrated circuit 152 (control circuit) has various functions such as driving processing of the radiation imaging apparatus 100, notification control of the receptor field information notifying portion 200, control of charging, and processing of signals detected by various sensors provided in the radiation imaging apparatus 100.

When the AEC function is used, the integrated circuit 152 monitors a charge signal (dose reaching a receptor field) generated in a predetermined region of the sensor panel 140 based on receptor field information from the radiation imaging control unit 20. When the integrated circuit 152 detects that the charge signal reaches a predetermined value or more, it transmits to the radiation imaging control unit 20 a signal for stopping irradiation. When the dose reaching the receptor field changed by the receptor field information operation portion 210 becomes equal to or higher than a dose threshold, the integrated circuit 152 (control circuit) outputs a signal for stopping irradiation.

The sensor panel 140 of the radiation imaging apparatus 100 includes a plurality of two-dimensionally arrayed radiation detection pixels. The integrated circuit 152 (control circuit) monitors a dose reaching some pixels selected as receptor fields used in radiation imaging among the plurality of radiation detection pixels. Also, the integrated circuit 152 (control circuit) monitors a dose reaching the pixels of the receptor field changed by the receptor field information operation portion 210 among the plurality of radiation detection pixels. When the dose reaching the monitoring target receptor field becomes equal to or higher than the dose threshold, the integrated circuit 152 (control circuit) outputs a signal for stopping irradiation.

A rigid base 144 is bonded to a surface of the sensor panel 140 opposite to the radiation incident surface so as not to cause a deformation and a crack by an external load, vibrations at the time of transportation, and the like. If necessary, a radiation shielding member (not shown) may be attached to the base 144 to, for example, suppress radiation deterioration of the electric circuit board 143 and reduce scattered radiation from behind the radiation imaging apparatus 100. The radiation shielding member can be formed from, for example, a high-density material such as molybdenum, iron, or lead. A cushioning material 160 is properly provided between the housing of the radiation imaging apparatus 100 and each internal member, and obtains an external load distribution effect and a cushioning effect against a shock. The cushioning material 160 can be, for example, a silicon or urethane foamed material or a material made of silicone gel or the like.

(Example of Imaging Sequence in Radiation Imaging)

Figure 11:
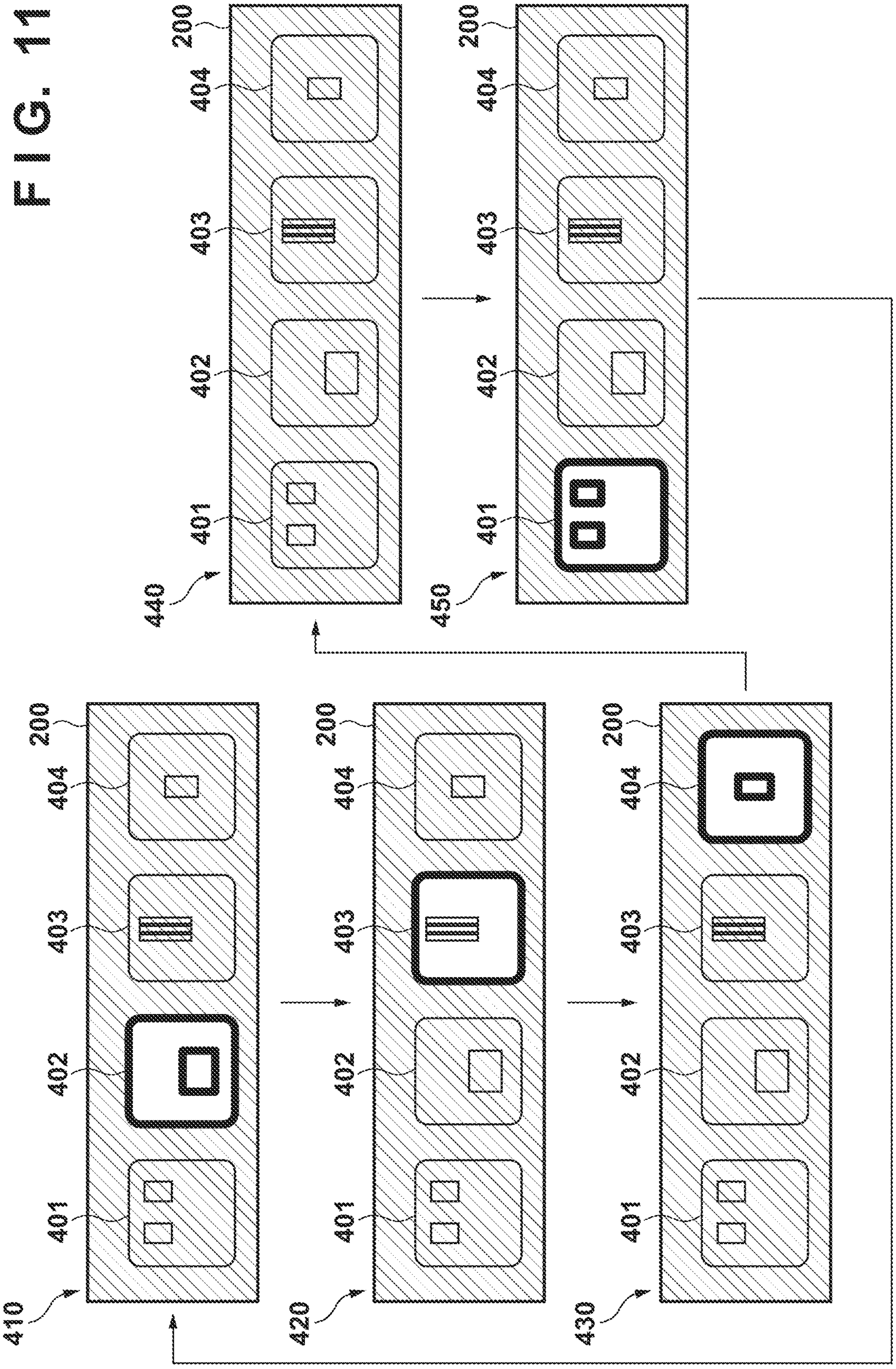
FIG. 11 is a view exemplifying a state in which the display of a receptor field information notifying portion is sequentially changed.

Next, an imaging sequence in radiation imaging using the AEC function, particularly, a sequence in positioning an object will be explained with reference to FIGS. 3, 4, and 11. FIG. 3 is a flowchart showing an imaging sequence in radiation imaging using the AEC function. FIG. 4 shows an example of images representing alignment of a subject in imaging using each selected receptor field. FIG. 11 is a view exemplifying a state in which the notification (display) of the receptor field information notifying portion 200 representing the selection state of a receptor field that changes depending on a target imaging region is sequentially changed by the operation of the receptor field information operation portion 210 provided on the radiation imaging apparatus 100.

At the time of imaging using the AEC function, the position (region) of a receptor field used in imaging is selected from a plurality of receptor field candidates based on protocol information or an input from the user (step S302). At this time, the user can confirm a selected receptor field on the display unit 21 of the radiation imaging control unit 20.

Then, the user moves close to the radiation imaging apparatus 100 (step S303), and performs alignment between the subject 40 and the radiation imaging apparatus 100 (step S304). In FIG. 4 showing an example of alignment, 4*a* of FIG. 4 shows an image representing an example of alignment of the subject at the time of imaging the front of the chest, and 4*b* of FIG. 4 shows an image representing an example of alignment of the subject at the time of imaging the abdomen. Also, 4*c* of FIG. 4 shows an image representing an example of alignment of the subject at the time of imaging the front of the lumbar spine, and 4*d* of FIG. 4 shows an image representing an example of alignment of the subject at the time of imaging the lateral aspect of the chest. That is, pairs of receptor fields (receptor field groups) in which one or more receptor fields are included and arranged at different positions are set in advance, and one receptor field group is selected from the receptor field groups. Four receptor field groups shown in 4*a* to 4*d* of FIG. 4 correspond to the region indices 201 to 204, respectively. When performing radiation imaging as shown in 4*a* to 4*d* of FIG. 4, the integrated circuit 152 (control circuit) changes the notification of the receptor field information notifying portion 200 in accordance with the target imaging region of the subject.

When aligning the target imaging region with the receptor field position, the user may determine that the alignment is difficult depending on the physique of the subject or the distortion of the skeleton, and the like, and switch the imaging to imaging using no auto exposure control function or perform imaging of another site first.

In general, the radiation imaging apparatus 100 is arranged in a room shielded not to leak radiation externally, and the radiation imaging control unit 20, the display unit 21, and the operation unit 22 are arranged outside the shielded room. The user who aligns a subject inside the shielded room cannot change the selection state of a receptor field using the operation unit 22 unless the user moves apart from the subject.

The radiation imaging apparatus 100 according to this embodiment includes the receptor field information notifying portion 200 and the receptor field information operation portion 210. The notification (display) of the receptor field information notifying portion 200 provided on the radiation imaging apparatus 100 corresponds to the display of receptor field information on the display unit 21. The user can visually check the receptor field information notifying portion 200 to recognize receptor field information and align the target imaging region with the position of the receptor field. By operating the receptor field information operation portion 210 provided on the radiation imaging apparatus 100, the user can change the selection state of the receptor field to a desired one.

The receptor field information notifying portion 200 includes selection information display portions corresponding to respective regions serving as receptor field candidates. As shown in FIG. 11, the receptor field information notifying portion 200 presents a display that allows the user to recognize a selected one of predetermined receptor field candidates. More specifically, selection information display portions 401, 402, 403, and 404 corresponding to respective regions (for example, four regions) serving as receptor field candidates are provided inside the receptor field information notifying portion 200. The selection information display portions 401 to 404 correspond to the region indices 201 to 204 shown in 10*a* of FIG. 10. For example, the selection information display portion 401 corresponds to the region index 201 shown in 10*a* of FIG. 10, the selection information display portion 402 corresponds to the region index 202, the selection information display portion 403 corresponds to the region index 203, and the selection information display portion 404 corresponds to the region index 204.

By lighting only a selection information display portion corresponding to a receptor field selected in accordance with protocol information or an input from the user, the user can visually recognize the selected one of the receptor fields.

When the user wants to change the receptor field, he/she can operate the receptor field information operation portion 210 to sequentially change the selection state of the receptor field. When the receptor field information operation portion 210 is operated, the integrated circuit 152 (control circuit) changes, in accordance with the operation of the receptor field information operation portion 210, the selection state of a receptor field announced (displayed) by the receptor field information notifying portion 200. As shown in FIG. 11, the selection state of the receptor field information notifying portion 200 is sequentially changed by the operation of the receptor field information operation portion 210 (410 to 450). Selection states of the receptor field information notifying portion 200 include a state in which at least one receptor field is selected from a plurality of receptor fields, and a state in which no receptor field is selected from a plurality of receptor fields.

In FIG. 11, the state 410 represents a display example in which the selection information display portion 402 is lighted and the position of the region index 202 is selected as a receptor field. The user checks this lighting state and aligns the target imaging region of the abdomen of the subject 40 with the position of the region index 202.

When the receptor field information operation portion 210 is operated, the selected receptor field is changed, and a signal for changing the receptor field used in radiation imaging is output to the integrated circuit 152 (control circuit). When the user wants to change the receptor field, he/she can operate the receptor field information operation portion 210 to sequentially change the selection state of the receptor field. More specifically, the user operates the receptor field information operation portion 210 to change the selection state of the receptor field from the state 410 to the state 420, as shown in FIG. 11. The receptor field changed by the receptor field information operation portion 210 is set as a receptor field used in radiation imaging.

The state 420 represents a display example in which the selection information display portion 403 is lighted and the position of the region index 203 is selected as a receptor field. The user checks this lighting state and aligns the target imaging region of the front of the lumbar spine of the subject 40 with the position of the region index 203.

Further, the user operates the receptor field information operation portion 210 to change the selection state of the receptor field from the state 420 to the state 430. The state 430 represents a display example in which the selection information display portion 404 is lighted and the position of the region index 204 is selected as a receptor field. The user checks this lighting state and aligns the target imaging region of the lateral aspect of the chest of the subject 40 with the position of the region index 204.

The user further operates the receptor field information operation portion 210 to change the selection state of the receptor field from the state 430 to the state 440. The state 440 represents an example in which the selection information display portions 401 to 404 are extinguished and no receptor field is selected. In this state, the auto exposure control function is not used.

The user further operates the receptor field information operation portion 210 to change the selection state of the receptor field from the state 440 to the state 450. The state 450 represents a display example in which the selection information display portion 401 is lighted and the position of the region index 201 is selected as a receptor field. The user checks this lighting state and aligns the target imaging region of the front of the chest of the subject 40 with the position of the region index 201.

The user further operates the receptor field information operation portion 210 to change the selection state of the receptor field from the state 450 to the state 410. As described with reference to FIG. 11, when the user wants to change the receptor field, he/she can operate the receptor field information operation portion 210 to sequentially change the selection state of the receptor field.

Note that the receptor field information notifying portion 200 suffices to have a function of presenting a selected receptor field. For example, a selected receptor field may be displayed by switching the color, or displayed on the display or the like. Alternatively, a receptor field may be announced by sound. For example, the receptor field information notifying portion 200 may announce at least one receptor field used in radiation imaging by using, as a display capable of identifying the respective receptor fields, at least one display among a numeral, a graphic symbol, a color, and an array of receptor fields within the incident surface of radiation. Also, the receptor field information notifying portion 200 may announce at least one receptor field used in radiation imaging by sound capable of identifying the respective receptor fields.

The receptor field information operation portion 210 suffices to have a function of changing a selected receptor field. For example, a selected receptor field may be switched by a slide switch, or a plurality of buttons, a touch sensor, or the like may be used to directly select each selection candidate. The arrangement of the receptor field information notifying portion 200 and receptor field information operation portion 210 is not limited to the side surface of the radiation imaging apparatus 100, and the receptor field information notifying portion 200 and the receptor field information operation portion 210 may be provided on the radiation incident surface of the radiation imaging apparatus 100 or a surface opposing the radiation incident surface. Note that a grid may be mounted on the radiation incident surface to reduce scattered radiation, or the surface opposing the radiation incident surface may be covered with a fixed base or the like, which may influence the visibility and operability. However, the visibility and operability at the time of alignment can be ensured by providing the receptor field information notifying portion 200 on the side surface of the radiation imaging apparatus 100.

Receptor field information notifying portions 200 and receptor field information operation portions 210 can also be provided at a plurality of portions including the side surface of the radiation imaging apparatus 100. In alignment work of a target imaging region, the user can visually recognize a selected receptor field by visually checking the receptor field information notifying portion 200 arranged at an easy-to-see position in accordance with the use form of the radiation imaging apparatus 100. When the user wants to change a receptor field, he/she can sequentially change the selection state of the receptor field by operating the receptor field information operation portion 210 arranged at an easy-to-operate position.

After alignment is performed, irradiation is started by a user operation (step S305). The integrated circuit 152 sets a receptor field changed by the receptor field information operation portion 210 as a monitoring target, and monitors a dose reaching the receptor field. More specifically, the integrated circuit 152 repetitively performs a comparison operation between the dose reaching the monitoring target receptor field and a dose threshold set in receptor field information (step S306). If the integrated circuit 152 determines that the dose reaching the monitoring target receptor field becomes equal to or higher than the set dose threshold, it transmits to the radiation imaging control unit 20 a signal (irradiation stop signal) for stopping irradiation. The radiation generation control unit 31 stops the irradiation of the radiation source 30 under the control of the radiation imaging control unit 20 that has received the irradiation stop signal (step S307).

According to this embodiment, when a subject is aligned with a receptor field, the selection state of the receptor field can be easily changed by using the receptor field information operation portion 210 provided on the radiation imaging apparatus 100. According to this embodiment, an irradiation radiation dose to a selected receptor field region is managed to be a predetermined dose, and proper irradiation to a subject can be implemented.

Sixth Embodiment

In the sixth embodiment, a highly user-friendly portable radiation imaging apparatus among radiation imaging apparatuses having the AEC function will be described. The portable radiation imaging apparatus to be described in this embodiment is highly flexible in usage and has a plurality of general-purpose receptor field choices. One or more receptor fields can be selected from the receptor field choices to decide receptor fields optimum for various imaging operations.

FIG. 6 is a view showing a radiation imaging apparatus 500 according to the second embodiment. Even in the sixth embodiment, the radiation imaging apparatus has an arrangement similar to the radiation imaging apparatus 500 shown in FIG. 6. The radiation imaging apparatus 500 has five receptor field choices as a plurality of receptor fields (receptor field candidates) capable of monitoring an irradiation radiation dose. Displays (receptor field indices 531 to 535) representing respective receptor fields are provided on the radiation incident surface. Numerals "1" to "5" are printed on the respective indices so that the user can identify the respective indices. The respective receptor field choices will be referred to as a region 1, region 2, region 3, region 4, and region 5 in the order of numerals shown in FIG. 6.

At the time of use, the user confirms the notification of a receptor field information notifying portion 501 provided on the radiation imaging apparatus 500. By confirming the notification of the receptor field information notifying portion 501, the user can easily confirm a receptor field region with which a target imaging region is aligned.

An integrated circuit 152 sets a receptor field announced by the receptor field information notifying portion 501 as a monitoring target, and monitors a dose reaching the monitoring target receptor field. According to this embodiment, in alignment, the user selects at least one receptor field from the five receptor field choices, and the integrated circuit 152 sets the receptor field announced by the receptor field information notifying portion 501 as a monitoring target and monitors a radiation dose irradiating the monitoring target receptor field, thereby implementing the AEC function. When a plurality of irradiation field regions are used as monitoring target receptor field regions from the five receptor field choices, the integrated circuit 152 can obtain pieces of dose information such as a maximum irradiation amount, an average irradiation amount, and a median based on the radiation doses of the irradiation field regions, select a piece of dose information from the obtained pieces of dose information, and perform comparative determination with a dose threshold.

An irradiation field region can be selected based on the target imaging region of a subject 40. For example, when imaging the front of the chest, there can be a use method of aligning two, upper right and upper left irradiation field regions with the target imaging regions (lungs) of the subject 40 and then imaging the target imaging regions. When the radiation imaging apparatus 500 is used in an orientation shown in FIG. 6, the region 1 (receptor field index 531) and the region 2 (receptor field index 532) are used as two, upper right and upper left irradiation field regions.

The radiation imaging apparatus 500 according to this embodiment includes the receptor field information notifying portion 501. The user can visually check the receptor field information notifying portion 501 to align a target imaging region with the position of a receptor field used in radiation imaging.

At this time, a selected region number is displayed on the receptor field information notifying portion 501 so that the user can recognize a selected receptor field. More specifically, the user is notified of the selected receptor field by lighting the selected region number while extinguishing unselected region numbers. In the receptor field information notifying portion 501 shown in FIG. 6, "1" representing the region 1 and "2" representing the region 2 are lighted while the remaining region numbers are extinguished.

Note that the selected receptor field region notifying method is not limited to this, and the receptor field information notifying portion 501 suffices to have a function of presenting a selected receptor field. For example, a selected receptor field may be displayed by switching the color, or displayed on the display or the like. Alternatively, a receptor field may be announced by sound.

When the portable radiation imaging apparatus 500 is used, it is conceivable that the user uses the radiation imaging apparatus 500 in various orientations. For example, in FIG. 6, the regions 1 and 2 are positioned upper right and upper left in the vertical direction (direction of gravity). It is also possible to rotate the radiation imaging apparatus 500 by 180° and use the regions 4 and 5 as upper right and upper left regions in the vertical direction (direction of gravity). To do this, the radiation imaging apparatus 500 can have an orientation detection function of automatically recognizing an orientation so that the user can use the radiation imaging apparatus 500 without paying attention to the orientation of the radiation imaging apparatus 500.

The radiation imaging apparatus 500 according to this embodiment includes a sensor (detector) that detects the orientation of the radiation imaging apparatus 500 in the vertical direction. The integrated circuit 152 (control circuit) changes the notification of the receptor field information notifying portion 200 based on the detection result of the sensor. For example, the orientation detection function of detecting the orientation of the radiation imaging apparatus 500 in the vertical direction (direction of gravity) by detecting the vertical direction (direction of gravity) by an acceleration sensor or detecting a moving amount or a rotation angle by a combination with a gyrosensor can be implemented.

In the radiation imaging apparatus 500 according to this embodiment, the integrated circuit 152 (control circuit) can control the notification of the receptor field information notifying portion 501 by using the orientation detection function. The integrated circuit 152 (control circuit) changes the notification of the receptor field information notifying portion 501 based on the detection result of a change of the orientation of the radiation imaging apparatus 500 in the vertical direction. For example, when the regions 1 and 2 are set (selected) in receptor field information, the integrated circuit 152 detects (determines) the orientation of the radiation imaging apparatus 500 based on the detection result of the acceleration sensor or the like. The integrated circuit 152 determines on which of the upper side of the radiation imaging apparatus 500 in the vertical direction and the lower side in the vertical direction, irradiation field regions corresponding to the regions 1 and 2 are positioned. For example, when the irradiation field regions corresponding to the regions 1 and 2 are positioned on the upper side of the radiation imaging apparatus 500 in the vertical direction, the integrated circuit 152 determines that the orientation has not been changed from the setting of the receptor field information. In this case, under the control of the integrated circuit 152, the receptor field information notifying portion 501 announces the regions 1 and 2 as regions used in radiation imaging without changing the setting (regions 1 and 2) of the receptor field information.

On the other hand, when the irradiation field regions corresponding to the regions 1 and 2 are positioned on the lower side of the radiation imaging apparatus 500 in the vertical direction, the integrated circuit 152 determines that the orientation has been changed from the setting of the receptor field information. In this case, under the control of the integrated circuit 152, the receptor field information notifying portion 501 changes the setting (regions 1 and 2) of the receptor field information and announces, as regions used in radiation imaging, the regions 4 and 5 positioned on the upper side of the radiation imaging apparatus 500 in the vertical direction.

More specifically, when the radiation imaging apparatus 500 is used in the orientation shown in FIG. 6 (in the case where the orientation is not changed), the receptor field information notifying portion 501 announces "1" representing the region 1 and "2" representing the region 2. By confirming the notification of the receptor field information notifying portion 501, the user can select the regions 1 and 2 and align a target imaging region without determining the orientation.

In contrast, when the user rotates the radiation imaging apparatus 500 by 180° and uses it (in the case where the orientation is changed), the receptor field information notifying portion 501 announces "4" representing the region 4 and "5" representing the region 5 in accordance with the change of the orientation. By confirming the notification of the receptor field information notifying portion 501, the user can select the regions 4 and 5 and align a target imaging region without determining the orientation. The notification of the receptor field information notifying portion 501 can be controlled using the orientation detection function. This can implement an automatic rotation function for the receptor field position that automatically notifies the user of the regions 4 and 5 upon 180° rotation instead of the notification of the regions 1 and 2.

When the orientation of the radiation imaging apparatus 500 is changed, the radiation imaging apparatus 500 preferably has even an orientation detection state notifying function in addition to the receptor field information notifying portion 501 for higher user friendliness. The radiation imaging apparatus 500 according to this embodiment includes a plurality of orientation notifying portions 511 to 514 that announce the orientation of the radiation imaging apparatus 500. The integrated circuit 152 changes the notifications of the orientation notifying portions 511 to 514 based on the detection result of a change of the orientation of the radiation imaging apparatus 500 in the vertical direction.

As shown in FIG. 6, the radiation imaging apparatus 500 according to this embodiment includes, near respective side surfaces, the orientation notifying portions 511 to 514 that announce a side surface directed to the upper side in the vertical direction out of side surfaces of the radiation imaging apparatus. The radiation imaging apparatus 500 announces an orientation detection state by lighting an orientation notifying portion arranged near a side surface recognized as the upper portion. The integrated circuit 152 (control circuit) changes the notification of one orientation notifying portion out of the orientation notifying portions 511 to 514 based on either of the operation (operation signal) of the rotation operation portion 520 (receptor field information operation portion) and the detection result of the sensor (detector) that detects the orientation of the radiation imaging apparatus 500.

When the detection result of the sensor (detector) is used, the integrated circuit 152 detects (determines) the orientation of the radiation imaging apparatus 500 based on the detection result of an orientation detector such as an acceleration sensor. The integrated circuit 152 controls to light, out of the orientation notifying portions 511 to 514, an orientation notifying portion arranged near a side surface that is determined to be positioned at the upper portion (upper side in the vertical direction) of the radiation imaging apparatus 500.

When the radiation imaging apparatus 500 is used in the orientation shown in FIG. 6, the integrated circuit 152 controls to light the orientation notifying portion 511 positioned at the upper portion (upper side in the vertical direction) of the radiation imaging apparatus 500. When no orientation detection function is used, the integrated circuit 152 may control to extinguish all the orientation notifying portions so as to announce that the automatic rotation function is not used. Note that the orientation notifying method is not limited to this. For example, an orientation detection state may be announced by displaying, on the display of the radiation imaging apparatus 500, an arrow indicating a direction determined to be the upper portion (upper side in the vertical direction) of the radiation imaging apparatus 500.

When the radiation imaging apparatus does not have the orientation detection function, or radiation imaging is performed in a state in which the floor surface and the radiation incident surface of the radiation imaging apparatus 500 are almost parallel, the orientation detection function in the vertical direction (direction of gravity) cannot be used, and a subject is generally aligned with a predetermined receptor field. However, after the physique of the subject is confirmed at the time of alignment, the portrait/landscape orientation of the radiation imaging apparatus 500 whose radiation incident surface is rectangular (oblong) may be changed by 90°. More specifically, when the radiation imaging apparatus 500 is planned to be used in the portrait orientation, but the physique of the subject is large and the subject protrudes in the lateral direction, the radiation imaging apparatus 500 is changed to be used in the landscape orientation. As an operation portion at this time, the radiation imaging apparatus 500 includes a rotation operation portion 520 (receptor field information operation portion).

FIG. 7 is a view for explaining the operation of the radiation imaging apparatus 500 when the rotation operation portion 520 is operated. The radiation imaging apparatus 500 includes the receptor field information notifying portion 501 representing the selection state of a receptor field, the orientation notifying portions 511 to 514 that announce the orientation of the radiation imaging apparatus, and the rotation operation portion 520. When the rotation operation portion 520 (receptor field information operation portion) is operated, a signal (operation signal) indicating a change is output to the integrated circuit 152 (control circuit) to change the notification of the receptor field in the receptor field information notifying portion 501 and the orientation notifications of the orientation notifying portions 511 to 514. The integrated circuit 152 changes the notifications of the orientation notifying portions 511 to 514 based on the signal indicating a change by the rotation operation portion 520. Also, the integrated circuit 152 changes the notification (display) of the receptor field information notifying portion 501 based on the signal indicating a change by the rotation operation portion 520.

The following description assumes a case where the regions 1 and 2 are set in advance as receptor fields in receptor field information, that is, it is set to define the orientation notifying portion 511 as the upper portion (upper side in the vertical direction) and use upper right and upper left receptor fields. This state will be referred to as a state 601. In the state 601, the orientation notifying portion 511 is lighted, and the receptor field information notifying portion 501 announces "1" representing the preset region 1 and "2" representing the preset region 2.

If the user operates the rotation operation portion 520 in the state 601, the receptor field selection state is rotated by 90°, and the regions 2 and 5 that become upper right and upper left regions with the orientation notifying portion 512 serving as the upper portion (upper side in the vertical direction) are used (state 602). In the state 602, the orientation notifying portion 512 is lighted, and the receptor field information notifying portion 501 announces "2" representing the region 2 and "5" representing the region 5 in accordance with the change of the orientation.

Similarly, if the user operates again the rotation operation portion 520 in the state 602, the receptor field selection state is rotated by 90°, and the regions 4 and 5 that become upper right and upper left regions with the orientation notifying portion 513 serving as the upper portion (upper side in the vertical direction) are used (state 603). In the state 603, the orientation notifying portion 513 is lighted, and the receptor field information notifying portion 501 announces "4" representing the region 4 and "5" representing the region 5 in accordance with the change of the orientation.

Further, if the user operates again the rotation operation portion 520, the receptor field selection state is rotated by 90°, and the regions 1 and 4 that become upper right and upper left regions with the orientation notifying portion 514 serving as the upper portion (upper side in the vertical direction) are used (state 604). In the state 604, the orientation notifying portion 514 is lighted, and the receptor field information notifying portion 501 announces "1" representing the region 1 and "4" representing the region 4 in accordance with the change of the orientation.

If the user further operates the rotation operation portion 520, the state returns to the state 601. By operating the rotation operation portion 520, the user can easily change the selection state of a receptor field near the subject (near the radiation imaging apparatus 500), improving the user friendliness. Note that not all the states 601 to 604 need to be changed, and an operation of only changing the states 601 and 602 is sufficient to change the portrait/landscape orientation. Alternatively, an imaging procedure in which the portrait/landscape orientation is not changed is also conceivable, so only 180° rotation may be implemented.

The function of the rotation operation portion 520 may be implemented together with the automatic orientation detection function. When a manual rotation operation is performed with the rotation operation portion 520, the integrated circuit 152 can stop the operation of the automatic orientation detection function.

The integrated circuit 152 (control circuit) changes the notifying method so that an orientation notification based on the signal of the receptor field information operation portion 210 and an orientation notification based on the detection result of the sensor (detector) can be identified. As the notifying method, the integrated circuit 152 (control circuit) can change the notification color of the orientation notifying portions 511 to 514. For example, the integrated circuit 152 can control the notification of the orientation notifying portion to differ the color of notification light of the orientation notifying portions 511 to 514 by the manual operation of the rotation operation portion 520 from the color of notification light at the time of orientation notification by the automatic orientation detection function, so that an automatic orientation detection state and a manual orientation detection state can be identified.

According to this embodiment, the selection state of a receptor field can be easily changed when aligning a subject with a receptor field, and the highly user-friendly portable radiation imaging apparatus having the AEC function can be provided.

Seventh Embodiment

In the seventh embodiment, the arrangement of a radiation imaging apparatus capable of monitoring an irradiation dose with a configuration in which receptor field regions are subdivided in comparison with those in the fifth and sixth embodiments and a receptor field region is selected in accordance with the physique of a subject, the distortion of the skeleton, and the like will be described.

FIG. 8 is a view showing a radiation imaging apparatus 800 according to the third embodiment. Even in the seventh embodiment, the radiation imaging apparatus has an arrangement similar to the radiation imaging apparatus 800 shown in FIG. 8. In FIG. 8, 800 is a plane view of the radiation imaging apparatus 800 on the radiation incident surface side, and 82 in FIG. 8 is a side view of the radiation imaging apparatus 800. As shown in 800 of FIG. 8, a plurality of receptor field choices 810 are provided on the entire radiation incident surface of the radiation imaging apparatus 800. As an arrangement example of the receptor field choices 810, 800 of FIG. 8 shows an example in which the receptor field choices 810 are arranged in 3×5 regions. However, receptor fields are not limited to this example and may be subdivided into a larger number of regions. Since the subdivided receptor field choices 810 are arranged in a wide range, arbitrary receptor fields can be selected in accordance with the physique of a subject, the distortion of the skeleton, and the like. As the receptor field selection method, any selection method can be used from the above-described method of automatic selection based on an imaging protocol, the method of manual selection by a user, and a method of selection based on the recognition result of position information of a subject immediately before imaging. The position information of a subject is information representing the position of a subject within a reading range 132 (within an imaging possible range) of a sensor panel 140. In the radiation imaging apparatus 800 according to this embodiment, an integrated circuit 152 (control circuit) selects a receptor field used in radiation imaging based on position information of a subject within the imaging possible range in the radiation imaging apparatus 800. A receptor field information notifying portion 801 announces the receptor field selected by the integrated circuit 152.

As an arrangement of obtaining the recognition result of position information of a subject, for example, a camera provided on a radiation source 30 can be used. The radiation imaging apparatus 800 and the camera provided on the radiation source 30 can wirelessly communicate with each other via a wireless communication portion 135. The wireless communication portion 135 can obtain the recognition result of a subject recognized by the camera. Based on the recognition result of the subject obtained from the wireless communication portion 135, the integrated circuit 152 can specify information (position information of the subject) representing the position of the subject within the reading range 132 (within the imaging possible range) of the sensor panel 140.

The arrangement of obtaining the recognition result of a subject is not limited to the camera. The integrated circuit 152 may specify position information of a subject based on the recognition result of the state of contact with the subject by a pressure sensor or proximity sensor provided on the radiation incident surface of the radiation imaging apparatus 800.

The integrated circuit 152 selects a receptor field used in imaging based on position information of a subject. The integrated circuit 152 controls the receptor field information notifying portion 801 (82 in FIG. 8) provided on the radiation imaging apparatus 800, and the receptor field information notifying portion 801 notifies the user of the selected receptor field information. The receptor field information notifying portion 801 is, for example, a display and displays a receptor field selected as a receptor field used in imaging out of the receptor field choices 810. The user confirms a selection state in which a desired receptor field is selected, and then operates to start irradiation.

The receptor field information notifying portion 801 according to this embodiment can display both the selection state of a receptor field and position information of a subject obtained by the camera, the pressure sensor, the proximity sensor, or the like by display control of the integrated circuit 152. From the notification of the receptor field information notifying portion 801, the user can easily confirm whether the selection state of the receptor field is a desired state, and can easily confirm alignment between the subject and the receptor field.

The receptor field information notifying portion 801 may be formed from, for example, a touch panel display capable of changing a notification content (selection state of a receptor field) by the touch operation of the user. The receptor field information notifying portion 801 functions as a receptor field information operation portion, and changes a receptor field that is selected from a plurality of receptor fields capable of monitoring an irradiation radiation dose and is used in radiation imaging. When the selection state of a receptor field displayed by the receptor field information notifying portion 801 is not a desired selection state, the user can change (switch) the selection state of each receptor field to the selection state of a desired receptor field by a touch operation based on the receptor field information notifying portion 801 (receptor field information operation portion). That is, the receptor field information notifying portion 801 (receptor field information operation portion) outputs, to the integrated circuit 152 (control circuit), a signal for changing a receptor field selected based on position information of a subject within the imaging possible range in the radiation imaging apparatus 800.

In this fashion, when the selection state of a receptor field is not a desired state, the user can switch the selection state of each receptor field by a touch operation and easily obtain the selection state of a desired receptor field.

According to this embodiment, the selection state of a receptor field can be easily changed when aligning a subject with a receptor field, and the highly user-friendly portable radiation imaging apparatus having the AEC function can be provided.

Eighth Embodiment

In the eighth embodiment, an arrangement in which even when a radiation imaging apparatus is built in a gantry or the like, receptor field selection information can be operated near a subject will be described. A portable radiation imaging apparatus is sometimes built in an upright gantry or the like and used. At this time, it may be hard to operate a receptor field information operation portion provided on the radiation imaging apparatus. Considering this, the arrangement of a radiation imaging system in which a receptor field information operation device 920B is newly provided outside the gantry incorporating the radiation imaging apparatus will be explained in this embodiment. By changing receptor field information by the operation of the receptor field information operation device 920B, the user can change the receptor field information near a subject (near a radiation imaging apparatus 900), that is, at the time of alignment of the subject. The receptor field information is information representing the selection state of a receptor field. The user can change the selection state of a receptor field by changing the receptor field information by the operation of the receptor field information operation device 920B.

Figure 12:
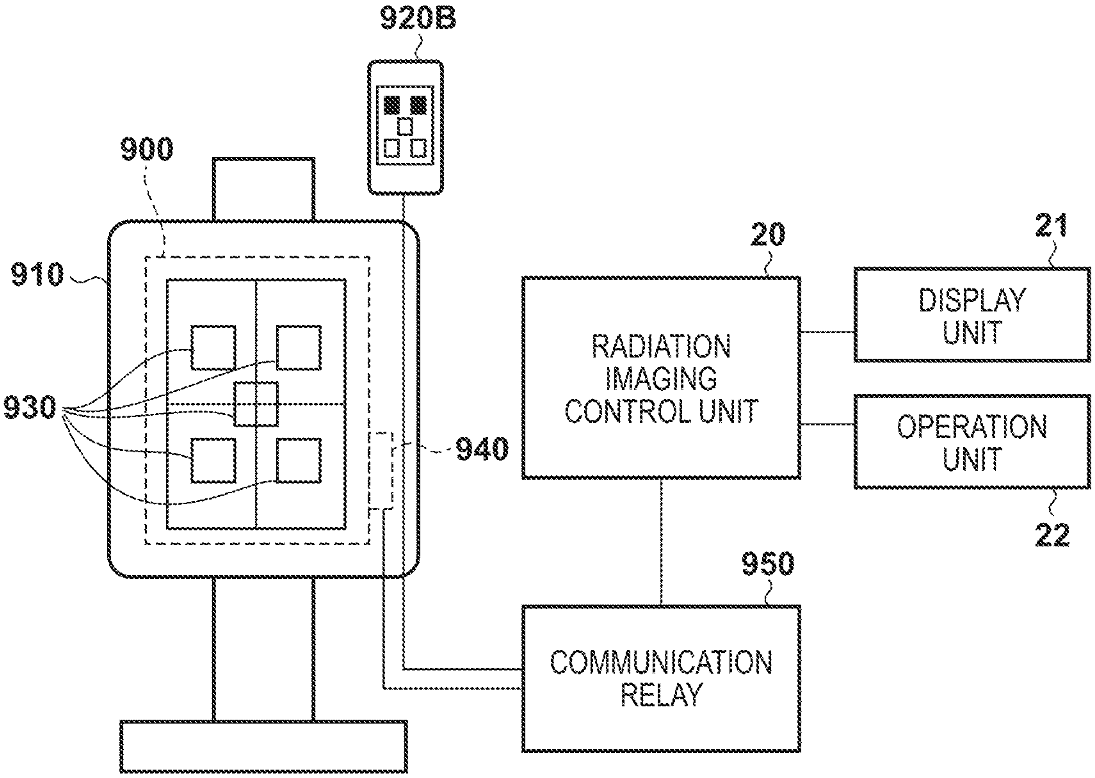
FIG. 12 is a view showing a radiation imaging system according to the eighth embodiment.

FIG. 12 is a view for explaining the arrangement of the radiation imaging system according to the eighth embodiment. The radiation imaging system according to this embodiment includes the radiation imaging apparatus 900, and the receptor field information operation device 920B that is arranged near the radiation imaging apparatus 900 and changes a receptor field used in radiation imaging via a communication portion (communication relay 950).

The operation of the receptor field information operation device 920B will be explained with reference to FIG. 12. The radiation imaging apparatus 900 according to this embodiment can adopt the arrangement described in each of the fifth to seventh embodiments, and is built inside a gantry 910 and used. The radiation imaging apparatus 900 is connected to the communication relay 950 via a wired connection connector 940. The receptor field information operation device 920B is fixed outside the gantry 910 and connected to the communication relay 950. The communication relay 950 is connected to a radiation imaging control unit 20. With the arrangement according to this embodiment, the radiation imaging apparatus 900, the receptor field information operation device 920B, and the radiation imaging control unit 20 can communicate with each other.

When a receptor field used in imaging is selected in accordance with imaging protocol information or an operation by the user, the radiation imaging control unit 20 transmits receptor field information to the radiation imaging apparatus 900. The receptor field information is also transmitted to the receptor field information operation device 920B. Upon receiving the receptor field information, the receptor field information operation device 920B announces receptor field information based on this information.

When the user wants to change the selected receptor field, he/she can operate the receptor field information operation device 920B to change the selection state to that of a desired receptor field. As the receptor field selection state change method, for example, any of the change methods exemplified in the fifth, sixth, and seventh embodiments may be applied to the receptor field information operation device 920B. For example, a receptor field information operation portion 210 (10*a* of FIG. 10) may be provided in the receptor field information operation device 920B, a rotation operation portion 520 (receptor field information operation portion: FIG. 6) may be provided, or a receptor field information notifying portion 801 (FIG. 8) capable of switching the selection state of each receptor field by a touch operation may be provided.

When the built-in orientation of the radiation imaging apparatus 900 is regulated by the wired connection connector 940 or the like, only the above-mentioned information can provide a satisfactory notification or operation. For a gantry in which the built-in orientation of the radiation imaging apparatus 900 can be arbitrarily changed, information about an orientation in which the radiation imaging apparatus 900 is built in the gantry can be necessary. In such a case, for example, either information can be used from, for example, orientation information of the radiation imaging apparatus 900 in the vertical direction (direction of gravity) based on detection information in the vertical direction (direction of gravity) by an acceleration sensor or the like provided in the radiation imaging apparatus 900, and orientation information of the radiation imaging apparatus 900 in the vertical direction (direction of gravity) based on detection information of various sensors or the like provided in the gantry. The orientation information of the radiation imaging apparatus 900 by the acceleration sensor or the like provided in the radiation imaging apparatus 900 is input from the wired connection connector 940 to the receptor field information operation device 920B via the communication relay 950. The orientation information of the radiation imaging apparatus by various sensors or the like provided in the gantry is input from a communication line (not shown) to the receptor field information operation device 920B via the communication relay 950. The receptor field information operation device 920B can control the notification contents of receptor field information based on the orientation information of the radiation imaging apparatus 900 in the vertical direction (direction of gravity).

When the user wants to change a receptor field selected based on the orientation information, he/she can operate the receptor field information operation device 920B to change the selection state to that of a desired receptor field. Even in this case, any of the change methods exemplified in the fifth, sixth, and seventh embodiments may be applied to the receptor field information operation device 920B.

According to this embodiment, even when the radiation imaging apparatus is built in the gantry or the like, receptor field information representing a receptor field selected as a receptor field used in imaging can be easily changed near a subject by operating the receptor field information operation device 920B.

According to the embodiment, a receptor field region used in radiation imaging can be announced or changed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A radiation imaging apparatus comprising a plurality of receptor fields for automatic exposure control (AEC), the radiation imaging apparatus comprising:

a flat panel radiation detector including an effective imaging area in which a plurality of radiation detection pixels are arranged;

a display device provided on an outer surface of a housing of the radiation imaging apparatus, in a region different from a region corresponding to the effective imaging area on a radiation incident surface of the housing; and one or more controllers configured to control information displayed by the display device to display information about the AEC, wherein the display device is provided on the radiation incident surface of the housing, in an edge region outside a region corresponding to the effective imaging area.

2. A radiation imaging apparatus comprising a plurality of receptor fields for automatic exposure control (AEC), the radiation imaging apparatus comprising:

a flat panel radiation detector including an effective imaging area in which a plurality of radiation detection pixels are arranged;

a display device provided on an outer surface of a housing of the radiation imaging apparatus, in a region different from a region corresponding to the effective imaging area on a radiation incident surface of the housing;

a plurality of markers provided on the radiation incident surface of the housing and respectively corresponding to the plurality of receptor fields, each of the plurality of markers being provided with identification information for identifying a corresponding receptor field; and one or more controllers configured to control information displayed by the display device to display information about the AEC, wherein the one or more controllers control the display device to display the identification information corresponding to a receptor field selected for AEC among the plurality of receptor fields.

3. A radiation imaging apparatus comprising a plurality of receptor fields for automatic exposure control (AEC), the radiation imaging apparatus comprising:

a flat panel radiation detector including an effective imaging area in which a plurality of radiation detection pixels are arranged;

a display device provided on an outer surface of a housing of the radiation imaging apparatus, in a region different from a region corresponding to the effective imaging area on a radiation incident surface of the housing; and one or more controllers configured to control information displayed by the display device to display information about the AEC, wherein the information about the AEC includes information about the plurality of receptor fields, and wherein the display device includes a plurality of display portions corresponding to the plurality of receptor fields, respectively, and wherein the one or more controllers control the display device such that only one or more of the plurality of display portions corresponding to at least one receptor field selected for AEC are lit while remaining display portions are extinguished.

4. The radiation imaging apparatus according to claim 3, wherein the one or more controllers control the display device such that none of the plurality of display portions is lit in a state in which no receptor field is selected for AEC.

5. The radiation imaging apparatus according to claim 3, wherein the one or more controllers sequentially change a lighting pattern of the plurality of display portions in accordance with a change of a receptor field selected for AEC.

6. The radiation imaging apparatus according to claim 3, further comprising an operation device,
 wherein the one or more controllers sequentially change a receptor field selected for AEC in accordance with an operation input to the operation device.

7. The radiation imaging apparatus according to claim 3, further comprising a detection unit configured to detect an orientation of the radiation imaging apparatus,
 wherein the one or more controllers control the information displayed by the display device based on a detection result of the detection unit.

8. A radiation imaging apparatus comprising a plurality of receptor fields for automatic exposure control (AEC), the radiation imaging apparatus comprising:
 a flat panel radiation detector including an effective imaging area in which a plurality of radiation detection pixels are arranged;
 a display device provided on an outer surface of a housing of the radiation imaging apparatus, in a region different from a region corresponding to the effective imaging area on a radiation incident surface of the housing, the display device being a touch panel display; and
 one or more controllers configured to control information displayed by the display device to display information about the AEC,
 wherein, in response to a touch operation on the display device indicating a desired receptor field, the one or more controllers change a receptor field selected for AEC among the plurality of receptor fields to select the desired receptor field.

9. A radiation imaging apparatus comprising a plurality of receptor fields for automatic exposure control (AEC), the radiation imaging apparatus comprising:
 a flat panel radiation detector including an effective imaging area in which a plurality of radiation detection pixels are arranged;
 a display device provided on an outer surface of a housing of the radiation imaging apparatus, in a region different from a region corresponding to the effective imaging area on a radiation incident surface of the housing;
 an operation device; and
 one or more controllers configured to control information displayed by the display device to display information about the AEC,
 wherein the one or more controllers sequentially change a receptor field selected for AEC among the plurality of receptor fields in accordance with an operation input to the operation device, and
 wherein the receptor field selected for AEC is changed by cycling through a plurality of predetermined selection states.

10. A radiation imaging apparatus comprising a plurality of receptor fields for automatic exposure control (AEC), the radiation imaging apparatus comprising:
 a flat panel radiation detector including an effective imaging area in which a plurality of radiation detection pixels are arranged;
 a display device provided on an outer surface of a housing of the radiation imaging apparatus, in a region different from a region corresponding to the effective imaging area on a radiation incident surface of the housing;
 a detection unit configured to detect an orientation of the radiation imaging apparatus; and
 one or more controllers configured to control information displayed by the display device to display information about the AEC,
 wherein the one or more controllers control the information displayed by the display device based on a detection result of the detection unit, and
 wherein the one or more controllers change the information displayed by the display device based on a detection result of a change of the orientation of the radiation imaging apparatus in a vertical direction.

11. A radiation imaging system comprising:
 a radiation imaging apparatus comprising a plurality of receptor fields for automatic exposure control (AEC);
 a radiation imaging control apparatus configured to control radiation imaging; and
 an external terminal configured to communicate with at least one of the radiation imaging apparatus and the radiation imaging control apparatus via a communication unit, and to display information about the AEC,
 wherein the information about the AEC includes information about the plurality of receptor fields, and
 wherein the external terminal displays the information about the plurality of receptor fields in a manner that enables identifying each of the plurality of receptor fields.

12. The radiation imaging system according to claim 11, wherein the external terminal is configured to accept an operation input for changing a receptor field used for AEC.

13. The radiation imaging system according to claim 12, wherein the external terminal is configured to transmit, via the communication unit, information indicating the change of the receptor field to at least one of the radiation imaging apparatus and the radiation imaging control apparatus.

14. A radiation imaging system comprising:
 a radiation imaging apparatus comprising a plurality of receptor fields for automatic exposure control (AEC);
 a radiation imaging control apparatus configured to control radiation imaging; and
 an external terminal configured to communicate with at least one of the radiation imaging apparatus and the radiation imaging control apparatus via a communication unit, and to display information about the AEC,
 wherein the external terminal is configured to change a display content of the information about the AEC based on orientation information of the radiation imaging apparatus.

15. A radiation imaging system comprising:
 a radiation imaging apparatus comprising a plurality of receptor fields for automatic exposure control (AEC);
 a radiation imaging control apparatus configured to control radiation imaging; and
 an external terminal configured to communicate with at least one of the radiation imaging apparatus and the radiation imaging control apparatus via a communication unit, and to display information about the AEC,
 wherein the external terminal is configured to display the information about the AEC and to accept an operation input for changing a receptor field used for AEC among the plurality of receptor fields, and
 wherein the external terminal is configured to transmit, via the communication unit, information indicating the change of the receptor field to at least one of the radiation imaging apparatus and the radiation imaging control apparatus.

* * * * *